US010979394B2

United States Patent
Takajo et al.

(10) Patent No.: US 10,979,394 B2
(45) Date of Patent: Apr. 13, 2021

(54) NETWORK SYSTEM, CONTROL APPARATUS, METHOD FOR CONSTRUCTING A VIRTUAL NETWORK, AND PROGRAM

(71) Applicant: NEC CORPORATION, Tokyo (JP)

(72) Inventors: Mamoru Takajo, Tokyo (JP); Masanori Takashima, Tokyo (JP); Kazushi Kubota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 16/077,106

(22) PCT Filed: Mar. 1, 2017

(86) PCT No.: PCT/JP2017/008144
§ 371 (c)(1),
(2) Date: Aug. 10, 2018

(87) PCT Pub. No.: WO2017/150623
PCT Pub. Date: Sep. 8, 2017

(65) Prior Publication Data
US 2019/0058695 A1 Feb. 21, 2019

(30) Foreign Application Priority Data
Mar. 2, 2016 (JP) .............................. JP2016-040429

(51) Int. Cl.
*H04L 29/06* (2006.01)
*H04L 12/66* (2006.01)
(Continued)

(52) U.S. Cl.
CPC ...... *H04L 63/0272* (2013.01); *H04L 12/4604* (2013.01); *H04L 12/4633* (2013.01);
(Continued)

(58) Field of Classification Search
CPC .............. H04L 63/0272; H04L 63/029; H04L 12/4604; H04L 12/4675; H04L 12/66;
(Continued)

(56) References Cited

U.S. PATENT DOCUMENTS 8,055,789 B2 11/2011 Richardson et al.
8,166,201 B2 4/2012 Richardson et al.
(Continued)

FOREIGN PATENT DOCUMENTS

CN 102447573 A 5/2012
CN 103997414 A 8/2014
(Continued)

OTHER PUBLICATIONS

European Telecommunications Standards Institute (ETSI), "Network Functions Virtualization—Update White Paper", Issue 1, pp. 1-16, [online], [retrieved on Jan. 20, 2016], Internet <URL:https://portal.etsi.org/NFV/NFV_White_Paper2.pdf>.
(Continued)

*Primary Examiner* — Nelson S. Giddins
(74) *Attorney, Agent, or Firm* — Sughrue Mion, PLLC

(57) ABSTRACT

A network system is connected to a first physical network comprising: a first data transmission node that transmits data used for a first service and a second data transmission node that transmits data used for a second service and to a second physical network including at least one apparatus for receiving data from the first and the second data transmission nodes, and constructs a virtual network for each service between the first and the second physical networks.

10 Claims, 21 Drawing Sheets

(51) Int. Cl.
*H04L 29/08* (2006.01)
*H04L 12/46* (2006.01)

(52) U.S. Cl.
CPC .......... *H04L 12/4675* (2013.01); *H04L 12/66* (2013.01); *H04L 63/029* (2013.01); *H04L 67/12* (2013.01); *H04L 67/16* (2013.01); *H04L 2012/4629* (2013.01)

(58) Field of Classification Search
CPC ..... H04L 12/4633; H04L 67/12; H04L 67/16; H04L 2012/4629
See application file for complete search history.

(56) References Cited

U.S. PATENT DOCUMENTS

| | | | |
|---|---|---|---|
| 9,281,995 | B2 | 3/2016 | Baba et al. |
| 9,614,812 | B2 | 4/2017 | Onoue |
| 9,654,394 | B2 | 5/2017 | Kawai |
| 9,940,153 | B2 | 4/2018 | Yin et al. |
| 2008/0240122 | A1 | 10/2008 | Richardson et al. |
| 2012/0036236 | A1 | 2/2012 | Richardson et al. |
| 2012/0089707 | A1 | 4/2012 | Baba et al. |
| 2013/0142201 | A1 | 6/2013 | Kim et al. |
| 2014/0126418 | A1 | 5/2014 | Brendel et al. |
| 2014/0133354 | A1 | 5/2014 | Scharf et al. |
| 2014/0307744 | A1 | 10/2014 | Dunbar et al. |
| 2014/0310393 | A1 | 10/2014 | Baba et al. |
| 2015/0049636 | A1 | 2/2015 | Tai |
| 2015/0134777 | A1 | 5/2015 | Onoue |
| 2015/0146736 | A1* | 5/2015 | Kawai ................ H04L 12/4633 370/400 |
| 2015/0355934 | A1 | 12/2015 | Yin et al. |
| 2015/0365278 | A1* | 12/2015 | Chakrabarti ........ H04L 41/0806 370/254 |
| 2016/0164728 | A1* | 6/2016 | Chakrabarti .......... H04L 63/029 370/254 |
| 2017/0149900 | A1 | 5/2017 | Moriguchi et al. |

FOREIGN PATENT DOCUMENTS

| | | |
|---|---|---|
| CN | 104104534 A | 10/2014 |
| CN | 104221334 A | 12/2014 |
| JP | 2002-009847 A | 1/2002 |
| JP | 2006-217704 A | 8/2006 |
| JP | 2009-188622 A | 8/2009 |
| JP | 2011-034388 A | 2/2011 |
| JP | 2012-049712 A | 3/2012 |
| JP | 2013-021423 A | 1/2013 |
| JP | 2013-162418 A | 8/2013 |
| JP | 2014-068285 A | 4/2014 |
| JP | 2014-523173 A | 9/2014 |
| JP | 2015-505431 A | 2/2015 |
| JP | 2015-095784 A | 5/2015 |
| JP | 2016-006922 A | 1/2016 |
| WO | 2013/172391 A1 | 11/2013 |

OTHER PUBLICATIONS

International Search Report of PCT/JP2017/008144 dated May 30, 2017.
Communication dated Jan. 7, 2019, from European Patent Office in counterpart application No. 17760087.1.
Communication dated Jun. 8, 2020, from The China National Intellectual Property Administration in Application No. 201780014425.X.
Huawei, "Testing at multiple antenna connectors", 3GPP TSG-RAN WG4 Meeting #69, R4-136464, Nov. 11-15, 2013. San Francisco, USA, pp. 1-2 (2 pages total).
Japanese Office Action for JP Application No. 2019-156259 dated Feb. 24, 2021, with English Translation.

* cited by examiner

FIG. 5

| SENSOR ID | VIRTUAL NW ID | USER |
|---|---|---|
| XXXXXXX1 | VLAN 1 | CARRIER A |
| XXXXXXX2 | VLAN 1 | CARRIER A |
| XXXXXXX3 | VLAN 1 | CARRIER A |
| .. | .. | .. |
| XXXXXXXN | VLAN 1 | CARRIER A |
| YYYYYYY1 | VLAN 2 | CARRIER B |
| .. | . | .. |

FIG. 6

| GW ID | TUNNEL TRANSMISSION SOURCE ADDRESS | TUNNEL DESTINATION ADDRESS | VIRTUAL NW ID | ... |
|---|---|---|---|---|
| IoT-GW311 | 1.1.1.1 | 1.1.1.2 | VLAN 1 | ... |
| IoT-GW311 | 1.1.1.1 | 1.1.1.2 | VLAN 2 | ... |
| GW321 | 1.1.1.2 | 1.1.1.1 | VLAN 1 | ... |
| GW321 | 1.1.1.2 | 1.1.1.1 | VLAN 2 | ... |
| . | . | | | ... |

NETWORK SYSTEM, CONTROL APPARATUS, METHOD FOR CONSTRUCTING A VIRTUAL NETWORK, AND PROGRAM

CROSS-REFERENCE TO RELATED APPLICATIONS

The present invention is a National Stage of International Application No. PCT/JP2017/008144 filed Mar. 1, 2017, and is based upon Japanese patent application No. 2016-040429 filed on Mar. 2, 2016, the disclosure of which is incorporated herein in its entirety by reference thereto.

FIELD

The present invention relates to a network system, control apparatus, method for constructing a virtual network, and program, and in particular relates to a network system, control apparatus, method for constructing a virtual network, and program that treat data acquired from a sensor.

BACKGROUND

Patent Literature 1 discloses an inter-LAN (Local Area Network) connection service operation coordination apparatus in which a user of a connection service between LANs enables configuration change of a network portion of connection service managed by a telecommunications carrier. According to this publication, the inter-LAN connection service operation coordination apparatus enables setting of a connected network and information collection from a LAN side, in a service inter-connecting a plurality of user LANs using a connected network. There is a description that the inter-LAN connection service operation coordination apparatus has an agent that defines a connected network as a virtual switch or router using user-available resources for each user, possible settings, and information that can be referred to; that retains the definition information; and that enables control of the virtual switch or router from the LAN side; and the agent has a means to perform processing when a command is received from the LAN side, in response to the command, on a apparatus in the connected network.

Patent Literature 2 proposes a new platform that preferably integrates network virtualization technology and cognitive wireless technology. According to this literature, the cognitive virtualization network system uses a wired core network connected to a plurality of physical wireless access networks, and configures a core network formed of at least one of: the wired core network itself or a virtual core network configured virtually in the wired core network; and also configures a virtual cognitive wireless base station corresponding to a single or each of a plurality of the core networks at respective physical base stations of the wireless access network; and by establishing communication with the virtual cognitive wireless base station, a cognitive communication terminal can connect to the cognitive virtualization network formed from the core network and the virtual cognitive wireless base station. The cognitive virtualization network system is characterized in that it is possible to dynamically rebuild the single or plurality of cognitive virtualization networks that form the cognitive virtualization network system.

Patent Literature 3, in a configuration in which Ethernet (registered trademark) LANs, LAN1, LAN2, and LAN3, are each connected to an IP (Internet Protocol) network N by respective client edge apparatuses CE1, CE2, CE3, discloses a configuration in which exchange of control information associated with Ethernet packet transmission between the client edge apparatuses CE1, CE2 and CE3 is processed and controlled by an integrated server 10 connected to the respective client edge apparatuses CE1, CE2, CE3 via a control connection 21.

Patent Literature 4 discloses an access control system that enables control, in a case of inter-connecting home LANs by VPN (Virtual Private Network), of access to content retained in information domestic appliances connected by a home LAN.

Patent Literature 5 discloses an information collection system in which it is possible to report the occurrence of an abnormality with high accuracy, even where a concrete pole supporting electrical wiring collapses. Specifically, the information collection system has an inclination detection sensor that detects a change in state corresponding to the inclination of the concrete pole, and a wireless communication part that transmits detection information of the inclination detection sensor and self-identification information; and the system is provided with a sensor node attached to the concrete pole, and a gateway server that collects transmission information transmitted from the sensor node, and transmits the collected information to another communication network with a different communication protocol from the sensor node. With regard to the abovementioned sensor node, a wireless ad-hoc network is mutually configured with a sensor node installed in another concrete pole existing within a communicable distance.

Patent Literature 6 discloses a configuration in which meter reading data is collected at low cost, in a short time, and with high reliability, in a system in which multiple meter terminals transmit meter data to a host apparatus by multi hop wireless communication.

Patent Literature 7 discloses a VPN connection system in which VPN connectivity is assuredly enabled to terminals, by suitably generating routing information between a VPN connection destination network and terminals using VPN in a virtual environment.

Non-Patent Literature 1 is a white paper on Network Functions Virtualization (NFV) related to an exemplary embodiment of the present invention.

CITATION LIST

Patent Literature (PTL)

[Patent Literature 1]
Japanese Patent Kokai Publication No. JP2002-9847A
[Patent Literature 2]
Japanese Patent Kokai Publication No. JP2012-49712A
[Patent Literature 3]
Japanese Translation of PCT International Publication, Publication No. 2014-523173 A
[Patent Literature 4]
Japanese Patent Kokai Publication No. JP2009-188622A
[Patent Literature 5]
Japanese Patent Kokai Publication No. JP2006-217704A
[Patent Literature 6]
Japanese Patent Kokai Publication No. JP2011-34388A
[Patent Literature 7]
Japanese Patent Kokai Publication No. JP2013-21423A Non Patent Literature (NPL)

[Non-Patent Literature 1]
European Telecommunications Standards Institute (ETSI), "Network Functions Virtualization—Update White Paper", [online], [retrieved on Jan. 20, 2016], Internet <URL:https://portal.etsi.org/NFV/NFV_White_Paper2.pdf>

SUMMARY

The following analysis is given according to the present invention. As in Patent Literature 5 and 6, technology used in various forms is becoming widespread, whereby sensor nodes or meter terminals are given a communication function, carry out mutual communication, and collect data. In this type of technology, "things" are said to be connected to the Internet, so the term "Internet of Things" (IoT) is used.

Exemplary embodiments of IoT network systems include IoT apparatuses connecting to the internet via edge nodes such as gateways (GW) or the like, and individual Iot apparatuses connecting directly to the Internet or cloud, and if consideration is given to power consumption in the IoT devices, the former is advantageous. It is to be noted that both Patent Literature 5 and 6 employ the former in which gateways are disposed.

Henceforth, in IoT network systems, it is expected that monitoring and control will be carried out by sensors or the like, deployed by different carriers at the same site (for example, factory, office, home, street or the like). However, since carriers A and B are in a competitive relationship in different industries or the same industry, there is a demand to separate the networks. Since most of the data collected by these sensors relate to data for which there is a duty of confidentiality, such as personal information, company secrets, or the like, from this viewpoint also a need arises for isolating networks.

In such cases, each carrier separately prepares edge nodes with their respective responsibilities, and there is a problem regarding the necessity to isolate the networks. In actuality, in a case where a plurality of edge nodes are deployed, a problem occurs with regard to installation space in a home or the like, and a problem of cost arises in offices with regard to security management thereof, and disposing and management of these edge nodes.

It is an object of the present invention to provide a network system, a control apparatus, and a method and program for building a virtual network function, which can contribute to solving various problems related to a network in which a plurality of data transmission entities are deployed to transmit data used in different services.

According to a first aspect, a network system is provided that connects to a first physical network comprising: a first data transmission node that transmits data used for a first service and a second data transmission node that transmits data used for a second service; and a second physical network including at least one apparatus for receiving data from the first and the second data transmission nodes. More concretely, the network system constructs a virtual network between the first and the second physical networks for each of the services.

According to a second aspect, there is provided a control apparatus connected to a first edge node provided on a boundary with a first physical network comprising: a first data transmission node that transmits data used for a first service and a second data transmission node that transmits data used for a second service and to a second edge node provided on a boundary with a second physical network including at least one apparatus for receiving data from the first and the second data transmission nodes; and the control apparatus comprises means for controlling the first and the second edge nodes and constructing a virtual network for each of the services between the first and the second physical networks.

According to a third aspect, there is provided a method for constructing a virtual network comprising: causing a control apparatus, which is connected to a first edge node provided on a boundary with a first physical network including a first data transmission node that transmits data used for a first service and a second data transmission node that transmits data used for a second service and to a second edge node provided on a boundary with a second physical network including at least one apparatus, to receive data from the first and the second data transmission nodes receive setting information for constructing a virtual network for each of the services between the first and the second physical networks; and
causing the control apparatus to control the first and the second edge nodes and to construct a virtual network for each of the services on the basis of the setting information. The present method is tied to a particular machine, namely, the control apparatus that controls the edge nodes.

According to a fourth aspect, there is provided a program having a computer connected to a first edge node provided on a boundary with a first physical network comprising: a first data transmission node that transmits data used for a first service and a second data transmission node that transmits data used for a second service and to a second edge node provided on a boundary with a second physical network including at least one apparatus for receiving data from the first and the second data transmission nodes execute a process of receiving setting information for constructing a virtual network for each of the services between the first and the second physical networks; and a process of controlling the first and the second edge nodes and constructing a virtual network for each of the services on the basis of the setting information. Further, this program can be stored in a computer-readable (non-transient) storage medium. In other words, the present invention can be realized as a computer program product.

The meritorious effects of the present invention are summarized as follows.
According to the present invention, management is facilitated for data flowing in a network in which a plurality of data transmission entities are deployed to transmit data used by different services. Namely, the present invention can transform a network system into a network system that is more facilitated for management of data flowing in a network.

BRIEF DESCRIPTION OF DRAWINGS

FIG. 5 is a diagram showing an example of authentication information held by the controller in the first exemplary embodiment of the disclosure.

FIG. 6 is a diagram showing an example of virtual network setting information held by the controller in the first exemplary embodiment of the disclosure.

PREFERRED MODES

Figure 1:
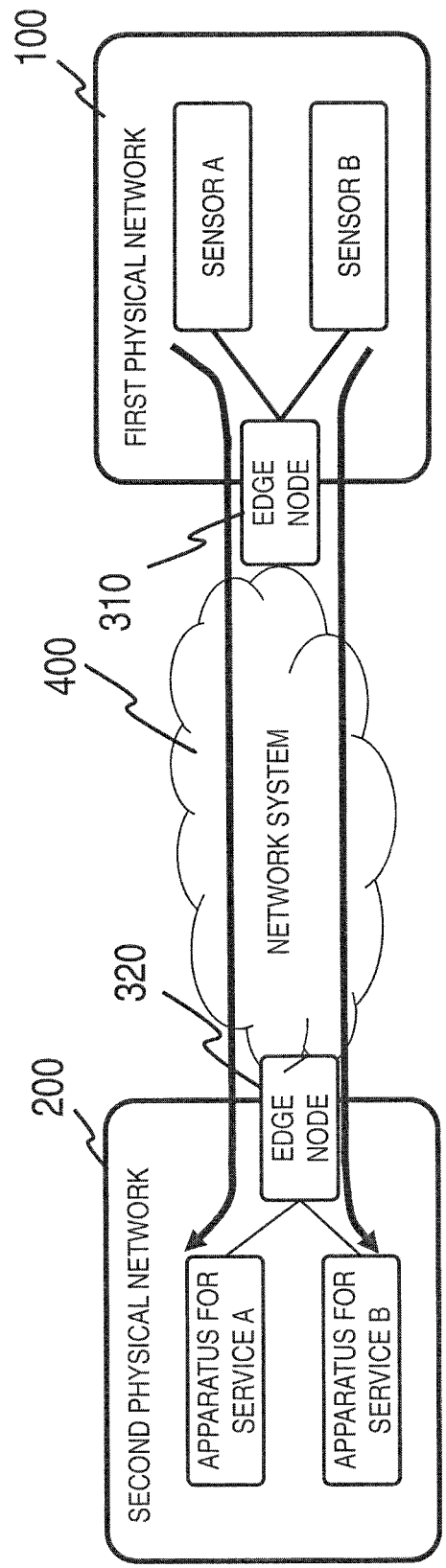
FIG. 1 is a diagram showing a configuration of an exemplary embodiment of the present disclosure.

First, a description is given of an outline of exemplary embodiments of the present invention, making reference to the drawings. It is to be noted that reference symbols in the drawings attached to this outline are added to respective elements for convenience, as examples in order to aid understanding, and are not intended to limit the present invention to modes illustrated in the drawings. Connection lines between blocks in the drawings used in the following description may be unidirectional or bidirectional. Unidirectional arrows schematically show flow of main signals (data), but do not exclude bidirectionality. In addition, although there are ports or interfaces at the connection points of the input and output of each block in the figures, they are omitted.

An exemplary embodiment of the present disclosure may be realized as shown in FIG. 1, by a network system 400, deployed between a first physical network 100 and a second physical network 200, the system configuring virtual network functions according to service.

More specifically, the first physical network 100 includes a first data transmission node (for example, sensor A in FIG. 1) that transmits data used in a first service, and a second data transmission node (for example, sensor B in FIG. 1) that transmits data used in a second service.

Meanwhile, the second physical network 200 includes apparatuses (service A apparatus and service B apparatus in FIG. 1) for receiving data from the first and second data transmission nodes. The network system 400 configures virtual network functions for each respective service between the 2 networks (refer to arrows between edge nodes 310 and 320 in FIG. 1). Thus, it is possible to transmit data obtained by respective data transmission nodes, with different networks.

It is to be noted that various methods may be considered with regard to methods of configuration of the virtual network functions. For example, as shown in FIG. 1, it is possible to realize tunneling corresponding to a virtual network between the edge node 310 deployed at an edge of the first physical network 100 and the edge node 320 deployed at an edge of the second physical network 200.

When the tunneling is performed, data transmitted from the first physical network 100 is, for example, encapsulated by the edge node 310, and transmitted to the second physical network 200. Data transmitted to the second physical network 200 is, for example, encapsulated by the edge node 320, and is transmitted to the service A apparatus or the service B device.

As another technique it is possible to provide a controller to control the network between the first physical network 100 and the second physical network 200, and to employ a method of logically slicing the network.

In this case, the controller respectively generates a data forwarding path for transmitting data of sensor A and a data forwarding path for transmitting data of sensor B. Notification is given of a processing rule for data transmission so as to transmit respective data by the generated forwarding path to each data forwarding apparatus (not shown in the drawings) included in the network system 400.

Figure 2:
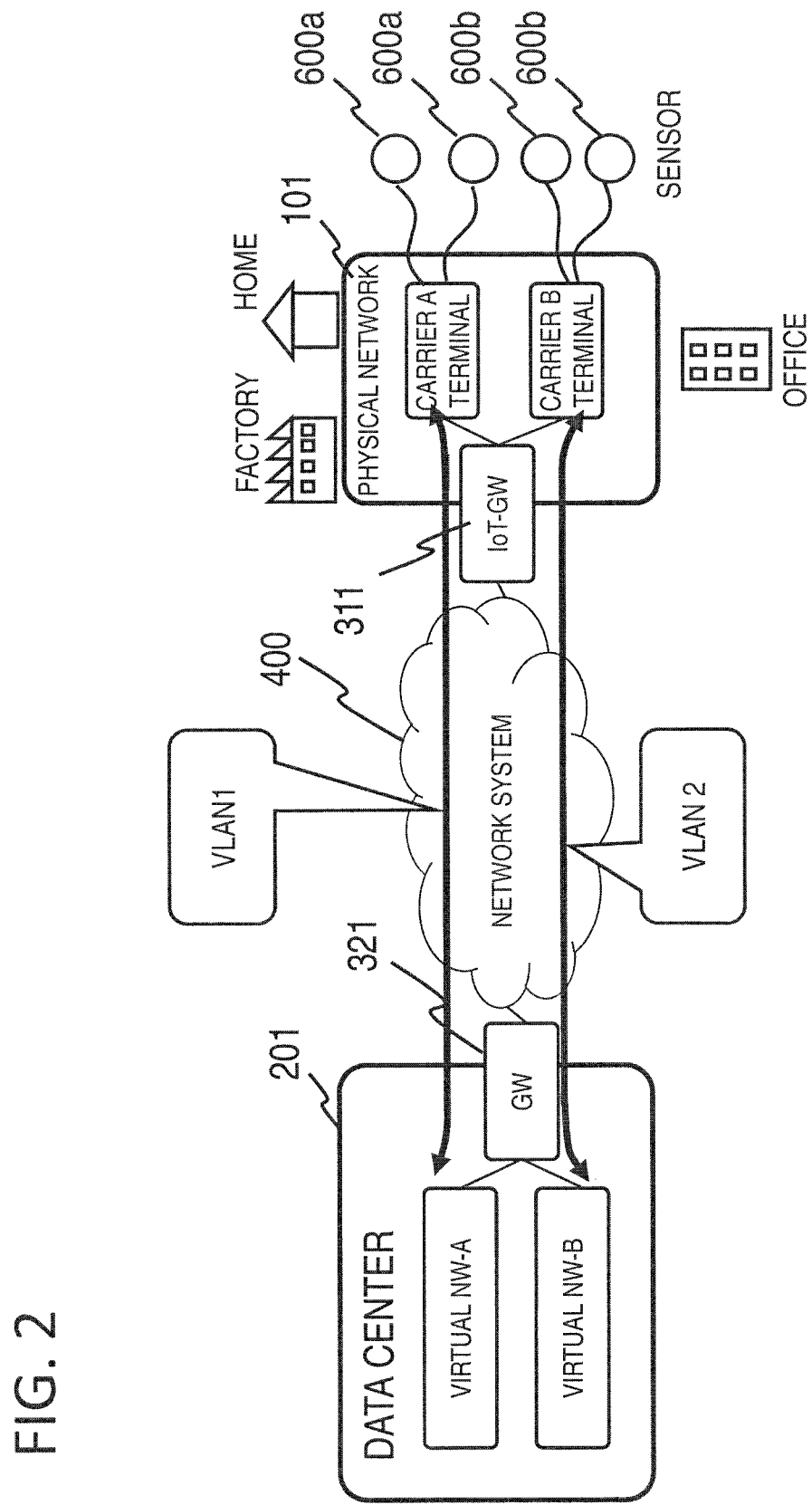
FIG. 2 is a diagram showing an application example of an exemplary embodiment of the present disclosure.

FIG. 2 is a diagram showing a specific application example of the configuration of FIG. 1. FIG. 2 shows a configuration in which a physical network 101 and a data center 201 are connected via the network system 400. The physical network 101 includes a carrier A terminal and a carrier B terminal (equivalent to the abovementioned "data transmission nodes") to which a plurality of sensor groups including sensors 600a and sensors 600b are connected (described below as "sensor 600" where sensors 600a and sensors 600b are not particularly distinguished), and an IoT-GW 311.

Sensor 600a is a sensor installed by carrier A, sensor 600b is a sensor installed by carrier B, and they are respectively connected to the carrier A terminal and the carrier B terminal. The carrier A terminal and the carrier B terminal are each connected to the IoT-GW 311.

Meanwhile, the data center 201 (equivalent to the second physical network) includes a virtual network built for each respective carrier (virtual NW-A and virtual NW-B), and a GW 321. Here, the virtual NW-A is a virtual network built for carrier A, and the virtual NW-B is a virtual network built for carrier B.

It is to be noted that in the description above, a virtual network is built for each carrier, but it is also possible to build a virtual network function for each service (here, a "service" is a function or convenience provided directly or indirectly to a user, using data collected by a sensor). In other words, in a case of providing a plurality of services, where the same carriers have the same base, for example, a virtual network function may be built for each respective service. Below, the description of "for a particular carrier (for each carrier)" may also be read as "for every service (for each service)".

In the configuration of FIG. 2, the network system 400 builds a virtual network function for each carrier, between the physical network 101 and the data center 201 (refer to arrows between the IoT-GW 311 and the GW 321 in FIG. 2). The IoT-GW 311 then transmits data received by the carrier A terminal from sensor 600a to the GW 321 opposite, via the virtual network (VLAN 1) for carrier A. Similarly, the IoT-GW 311 then transmits data received by the carrier B terminal from sensor 600b to the GW 321, via the virtual network (VLAN 2) for carrier B. The GW 321 forwards data received via the virtual network for carrier A to the virtual NW-A inside the data center 201, and forwards data received via the virtual network for carrier B to the virtual NW-B inside the data center 201.

In a case where carrier A provides a service for managing electrical power income/expenditure within a home, sensor data of each home (consumed power and solar power generated amount) is obtained from sensor 600a. Meanwhile, in a case where carrier B provides a service for air-conditioning control in an office, data of office thermometer or air-conditioner operating state is obtained from sensor 600b.

According to the configuration of FIG. 2, respective carrier terminals that have obtained the data transmit the data received from the sensor 600 to the IoT-GW 311. The IoT-GW selects a transmission destination and a network to be used for data transmission to the transmission destination (forwarding path), according to a setting by the network system 400, in accordance with a transmission source terminal of the received data, and sorts and transmits the data to the GW 321. The GW 321 identifies a virtual network by which the data has been sent, and forwards the received data to a virtual network within the data center 201. Clearly, it is also possible for the IoT-GW 311 to perform suitable processing such as statistical processing of received data, adjustment of transmission frequency, or the like.

In this way, sensor data (power consumption, solar power generation amount) of each home, for example, is forwarded to the virtual NW-A of carrier A that provides a service using this data. Carrier A provides a management service for power income/expenditure or a prediction service for power demand/power generation for an entire area or the like, based on sensor data (power consumption, solar power generation amount) of each home.

Similarly, office thermometer or air conditioner operation state data, for example, is forwarded to the virtual NW-B of carrier B that provides a service using this data. Carrier B provides an office air-conditioning management service, based on the office thermometer or air conditioner operation state data.

In this way, according to the embodiment of FIG. 2, it is possible to separately handle data of multiple carriers. A separate carrier requested to analyze data from carrier A or carrier B may perform big data analysis and provide results thereof to carriers A and B.

First Exemplary Embodiment

Figure 3:
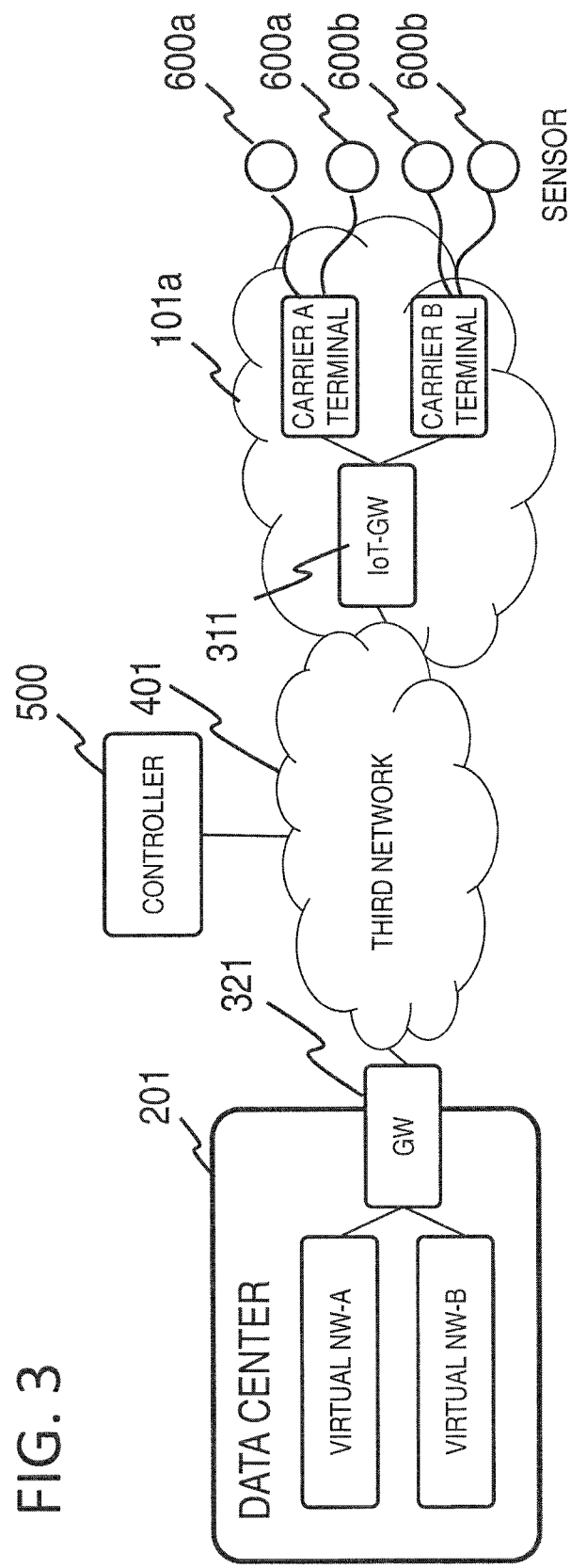
FIG. 3 is a diagram showing a configuration of a network system in a first exemplary embodiment of the present disclosure.

Next, a detailed description is given concerning a first exemplary embodiment of the present disclosure, making reference to the drawings. FIG. 3 is a diagram showing a configuration of a network system in the first exemplary embodiment of the disclosure. FIG. 3 shows a configuration in which a first network 101a and a data center 201 are connected via a third network 401.

The first network 101a, for example, is a network configured in a factory, office or home, in which sensors 600a and 600b of carrier A and carrier B are deployed. An IoT-GW 311 is deployed in the first network 101a as an edge node, to transmit data sent from terminals of respective carriers to the data center 201, via the third network 401. It is to be noted that connections between the sensor 600, carriers A and B, and the IoT-GW 311 may be wired or may be wireless.

A virtual network (virtual NW-A) of carrier A and a virtual network (virtual NW-B) of carrier B are built in the data center 201. Devices for respective carriers to provide services are connected to the virtual NW-A and the virtual NW-B. In the data center 201, a tunnel is established with the IoT-GW 311 on the first network 101a side, and a GW 321 that performs exchange of data is deployed.

In the third network 401 the IoT-GW 311 and a controller 500 that controls the GW 321 are connected.

On receiving data from the sensor via a carrier terminal, the IoT-GW 311 refers to virtual network information (tunnel information) set therein, specifies a virtual network to which the sensor in question belongs, adds (encapsulates) a suitable tunnel header, and forwards to the data center 201. In a case where the identification number of a transmission source sensor for data received from a carrier terminal is unknown, that is, the virtual network for transmission cannot be identified, the IoT-GW 311 transmits the identification number of the sensor question to the controller 500, and enquires whether or not data from the sensor 600 should be transmitted to the data center 201, and enquires about the virtual network in a case of transmitting the data. As a result of the enquiry, in a case of a response that the data may be transmitted to the data center 201 side, the IoT-GW 311 transmits the received data via the virtual network specified by the controller 500. In a case of receiving data from the GW 321 on the data center 201 side, the IoT-GW 311 removes (decapsulates) the tunnel header added to the data, and forwards to a carrier terminal specified in the destination.

On receiving data from the IoT-GW 311, via the third network, the GW 321 removes the tunnel header added to the data and forwards to the virtual NW-A or the virtual NW-B on the data center 201 side which is the destination. In a case of receiving data to be transmitted to the first network 101a side from the virtual NW-A or the virtual NW-B, similarly to the IoT-GW 311, the GW 321 transmits to the IoT-GW 311, via the virtual network specified by the controller 500.

Figure 4:
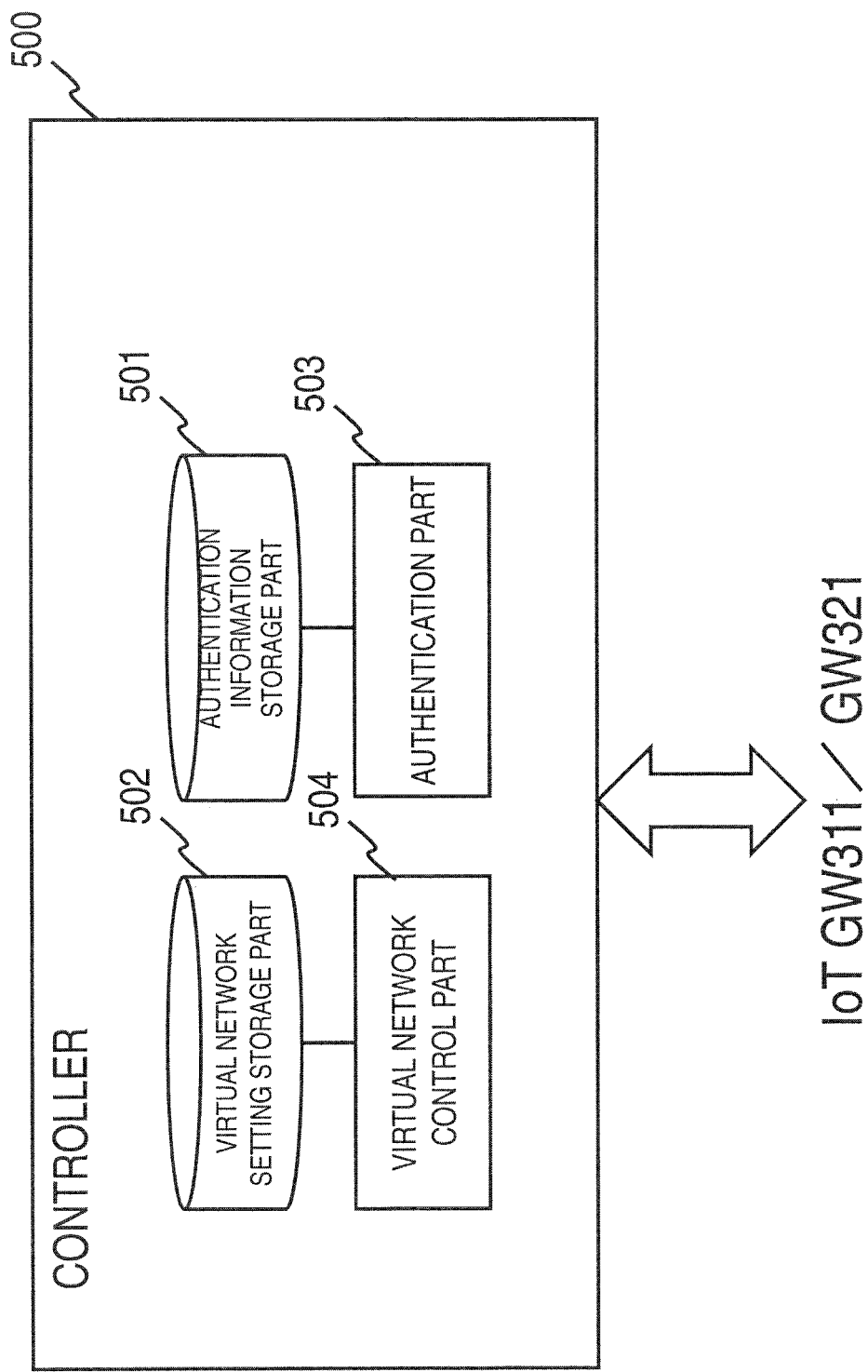
FIG. 4 is a functional block diagram showing a detailed configuration of a controller in the first exemplary embodiment of the disclosure.

FIG. 4 is a functional block diagram show g a detailed configuration of the controller in the first exemplary embodiment of the disclosure. FIG. 4 shows the controller 500 provided with an authentication information storage part 501, a virtual network setting storage part 502, an authentication part 503, and a virtual network control part 504.

The authentication information storage part 501 stores information for newly authenticating sensor, regarding which an attempt is newly made to transmit data to the data center side, within the sensor 600. FIG. 5 is a diagram showing an example of authentication information held by the authentication information storage part 501. The example of FIG. 5 shows a table associating sensor ID (sensor identification information), ID (identification information) of a virtual network to which the sensor belongs, and user (sensor owner). It to be noted that regarding the addition of an entry to the authentication information storage part 501, when respective carriers newly add a sensor, the controller 500 may be accessed and registration performed each time. Or, at a prescribed trigger, the controller 500 may query a carrier terminal, extract information of a sensor that is legitimately connected, and perform automatic registration. It is to be noted that the sensor ID (sensor identification information) may be information to enable each sensor to be uniquely identified, and for example, it is possible to use a MAC address (Media Access Control address) assigned to the sensor itself, apparatus ID or product serial information or the like.

The authentication part 503 uses information held in the authentication information storage part 501 to implement authentication of an unknown sensor. Specifically, in a case of receiving a query as to possibility of transmitting unknown sensor data from the IoT-GW 311, the authentication information storage part 501 determines whether or not to transmit the data from the sensor in question, according to whether or not the ID of the sensor in question is registered. In a case of success in authentication, in other words, a determination that it is possible to transmit data from the sensor in question, the authentication part 503 gives notification of the virtual network ID to which the sensor in question should belong, to the IoT-GW 311.

The virtual network setting storage part 502 holds information of a tunnel established between edge nodes (GW). FIG. 6 is a diagram showing an example of virtual network setting information held by the virtual network setting storage part 502. The example of FIG. 6 shows a table associating an address to be used as a tunnel header and a virtual network ID to be assigned, for each edge node (GW).

The virtual network control part 504 refers to content registered in the virtual network setting storage part 502, and performs setting of a tunnel for the IoT-GW 311 and the GW 321. Specifically, notification is given to a GW shown in the GW ID field in FIG. 6, of a list of sensors belonging to respective virtual networks, virtual network IDs thereof, address information to be used in a tunnel header, and the like. It is to be noted that for tunneling protocols, use may be made of overlay virtual network technology, such as NVGRE (Network Virtualization using Generic Routing Encapsulation), VXLAN (Virtual Extensible Local Area Network), or the like. In such a case, a TNI (Tenant Network Identifier) in NVGRE or a VNI (VXLAN Network Identifier) in VXLAN may be used as the abovementioned virtual network ID.

It is to be noted that the respective parts (processing means) of the controller 500 shown in FIG. 4 can be implemented by a computer program that executes the abovementioned respective processing on a computer configuring the controller 500, using hardware thereof.

It is to be noted that in the example of FIG. 3 the controller 500 is connected to a third network 401, but the controller 500 arrangement is not limited to the example of FIG. 3. For example, the controller 500 may be connected to the first network 101a or the data center 201 side.

Figure 7:
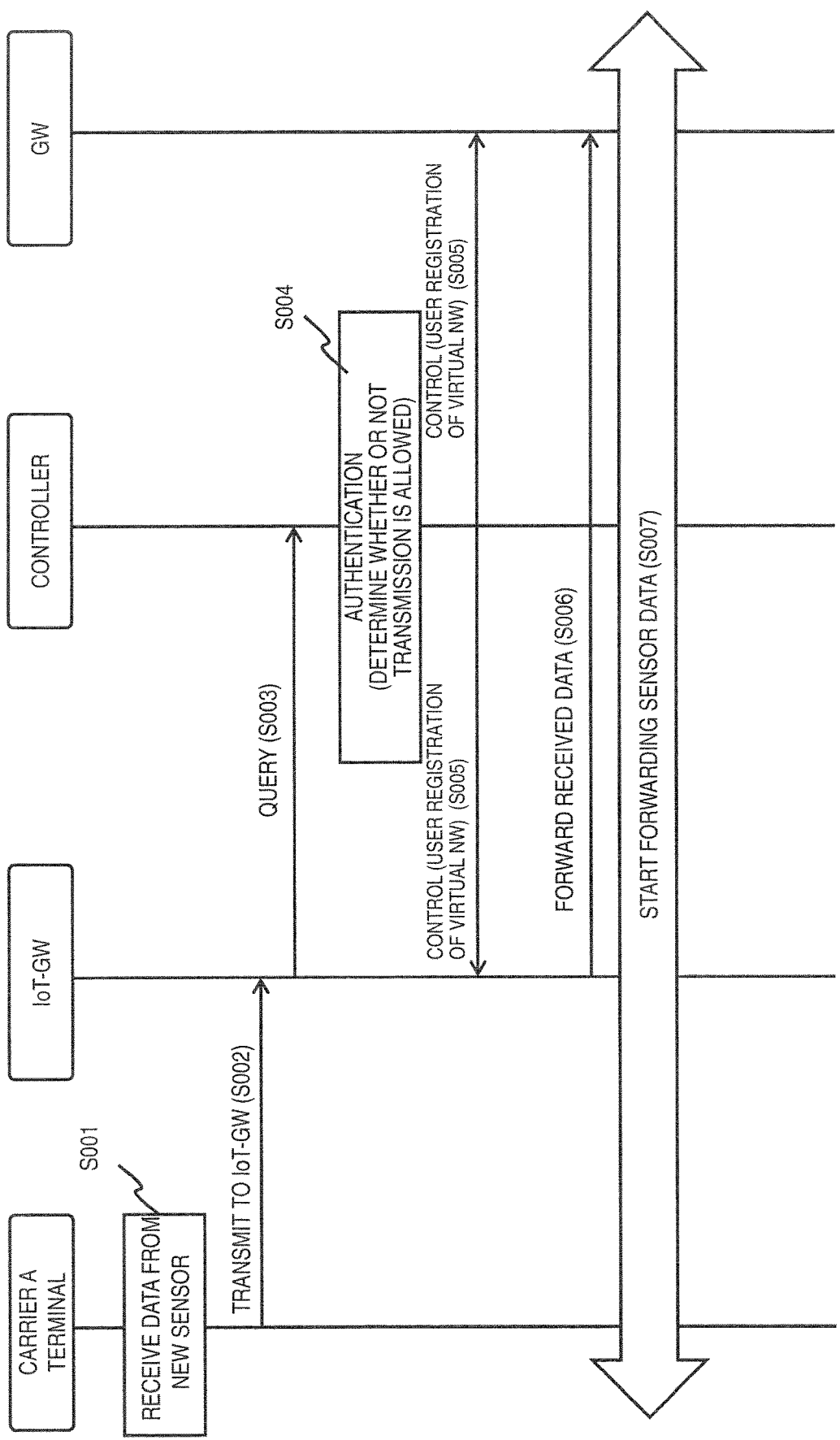
FIG. 7 is a sequence diagram representing operations of the network system in the first exemplary embodiment of the disclosure.
Figure 8:
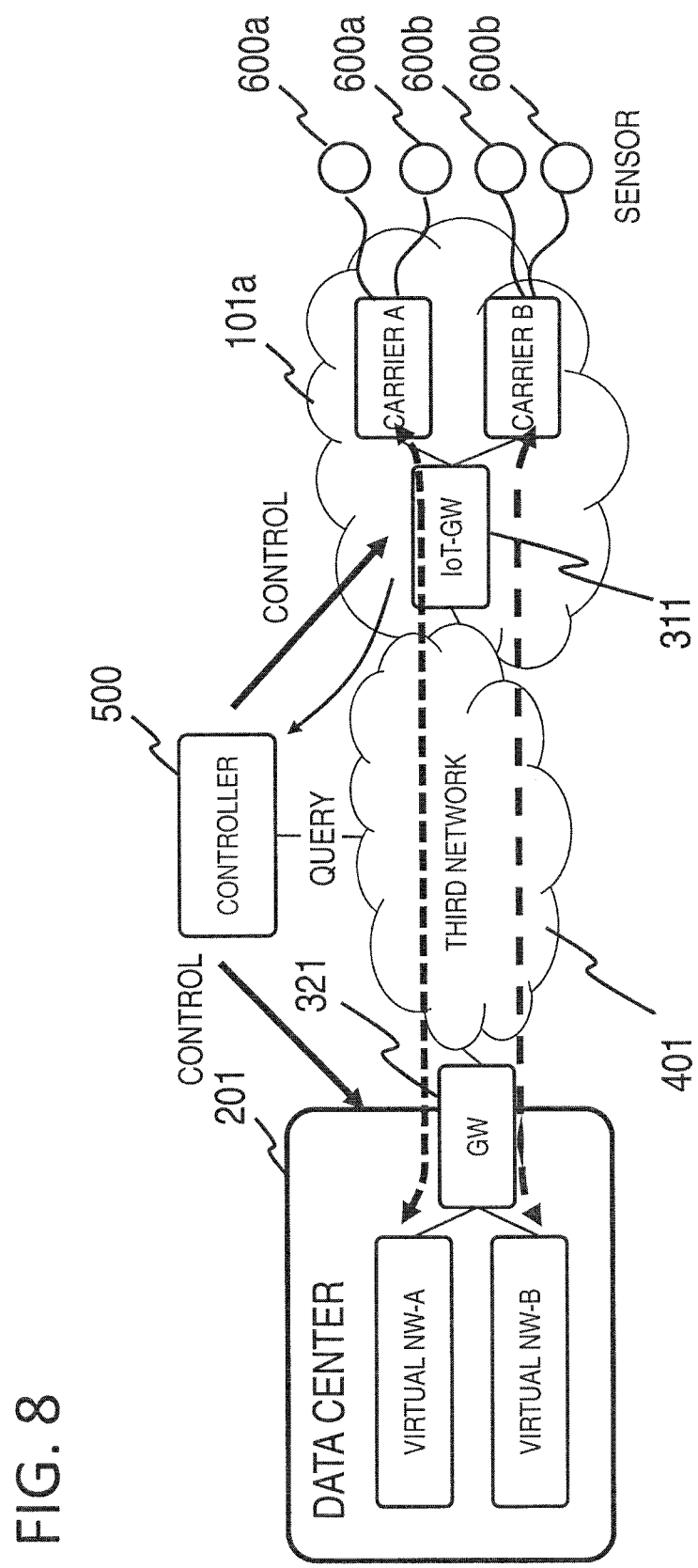
FIG. 8 is a diagram for describing operations of the network system in the first exemplary embodiment of the disclosure.

Continuing, a detailed description is given concerning operations of the present exemplary embodiment, making reference to FIG. 7 and FIG. 8. FIG. 7 is a sequence diagram representing operations of the network system in the first exemplary embodiment of the disclosure. FIG. 7 represents operations of an example in which a terminal of carrier A receives data from a newly added sensor. Referring to FIG. 7, first, on receiving data from the newly added sensor (step S001), the carrier A terminal transmits the data received from the sensor to the IoT-GW 311 (step S002). The data includes a sensor ID of the sensor in question.

On receiving the sensor data from the carrier A terminal, the IoT-GW 311 confirms whether or not the sensor ID in question is present, in a list (refer to sensor ID field in FIG. 5) of sensors specified in virtual network information pre-set by the controller 500. If it is ascertained as a result of the confirmation that this is an unknown sensor, the IoT-GW 311 transmits the ID of the sensor in question to the controller 500, and queries whether or not data from the sensor in question may be sent to the data center 201, and queries the virtual network in a case where the data is transmitted (step S003, refer to "query" in FIG. 8).

The controller 500 that receives the query refers to the authentication information storage part 501, and determines whether or not to transmit the data from the sensor that has received the query, to the data center 201 side (step S004). As a result of the determination, in a case of determining that the data from the sensor that has received the query may be transmitted to the data center 201 side, the controller 500 gives notification to the IoT-GW 311 and the GW 321, of a virtual network ID to which the sensor that has received the query should belong (step S005, refer to "control" in FIG. 8).

The IoT-GW 311 and the GW 321 that have received the notification add the sensor ID notified from the controller 500, to a list of sensors in virtual network information held by each thereof (refer to sensor ID field in FIG. 5). The IoT-GW 311 forwards the data received in step S002, via a virtual network specified by a virtual network ID notified from the controller 500 (step S006).

Below, due to being registered in the IoT-GW 311 and the GW 321, information of a new sensor is forwarded directly to the data center 201, without a query being made to the controller 500.

As described above, according to the present exemplary embodiment, it is possible to build and use an IoT network without each carrier providing dedicated IoT-GWs. It is to be noted that in the abovementioned exemplary embodiment, in order to simply the description, there are 2 carriers A and B, but there is no limit to the number of carriers.

In the present exemplary embodiment, more preferably the controller 500 may provide a function to update registered content of the virtual network setting storage part 502, under appropriate access limitation, with regard to carriers A and B. By so doing, it is possible to obtain an effect equivalent to carriers A and B each having a dedicated GW installed and a virtual network function built.

Second Exemplary Embodiment

Figure 9:
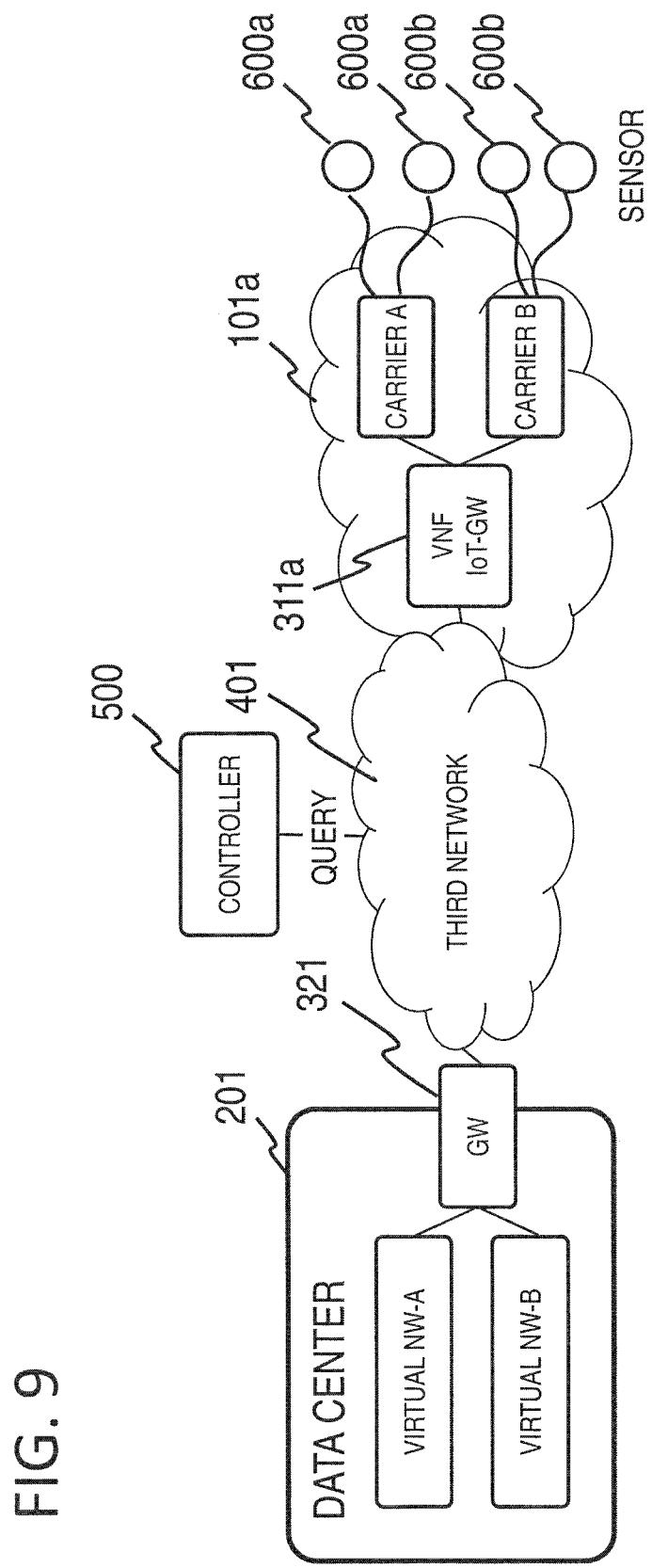
FIG. 9 is a diagram showing a configuration of a network system in a second exemplary embodiment of the present disclosure.

Continuing, a detailed description is given concerning a second exemplary embodiment of the present disclosure in which an IoT-GW is configured using network function virtualization (below, "NFV"), making reference to the drawings. FIG. 9 is a diagram showing a configuration of a network system in the second exemplary embodiment of the disclosure. A point of difference from the first exemplary embodiment is that the IoT-GW 311 is substituted by a VNF IoT-GW 311a configured by a VNF (Virtual Network Function). Since the basic configuration and operations are otherwise the same as the first exemplary embodiment, the description below is centered on points of difference.

Figure 10:
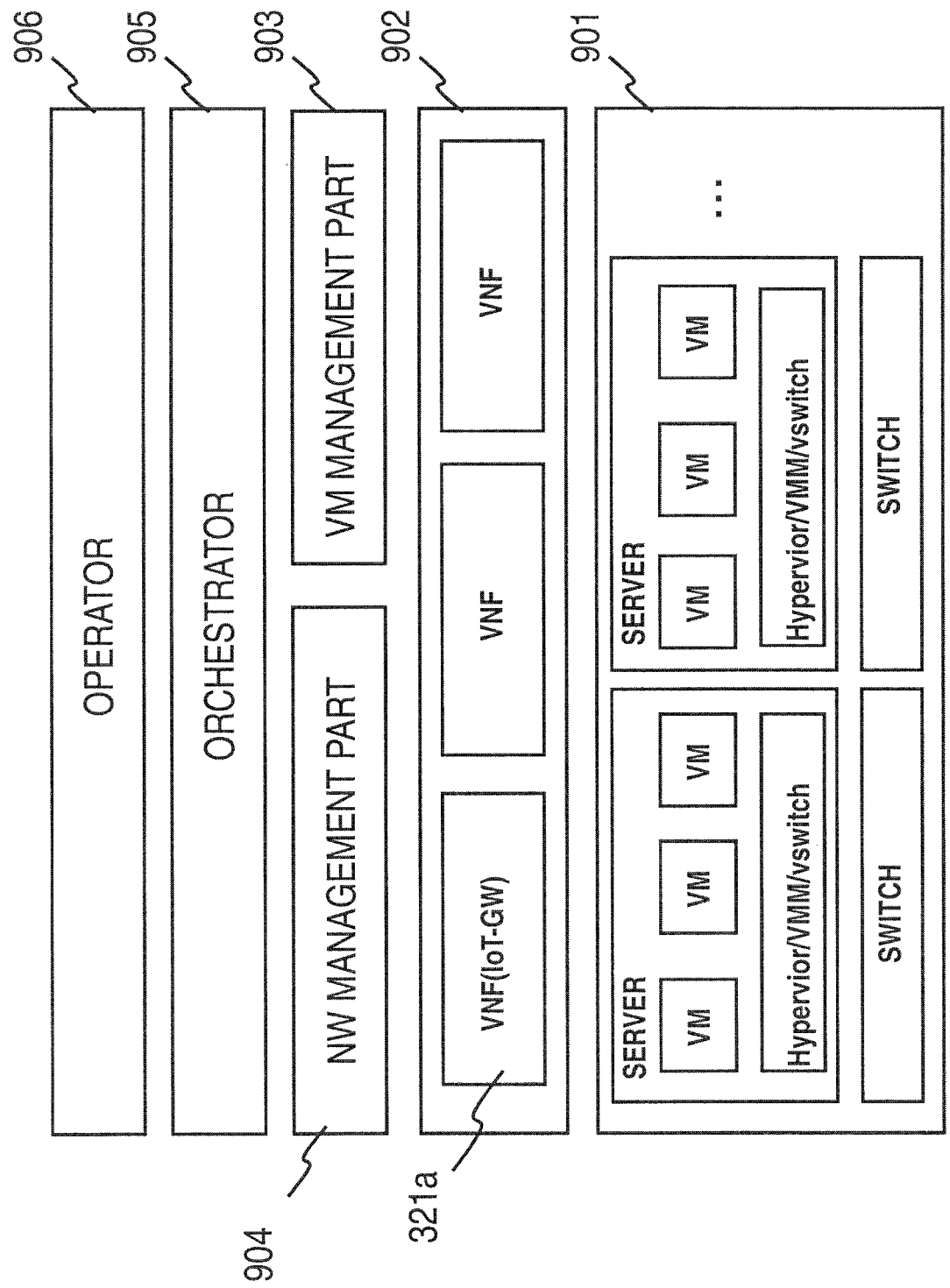
FIG. 10 is a diagram for describing the concept of an NFV used in the second exemplary embodiment of the disclosure.

First a description is given of the basic concept of network function virtualization (below "NFV"). FIG. 10 is a diagram for describing the concept of NFV. Reference symbol 901 in FIG. 10 represents NFVI (Network Function Virtualization Infrastructure: NFVI) that forms an execution infrastructure for VNF, and is configured by hardware resources such as switches and servers forming operation infrastructure for VM (virtual machines). In other words, the NFVI 901 is an infrastructure in which hardware resources such as servers and the like are flexibly handled as virtual hardware resources, such as virtualized computing, virtualized storage, and virtualized networks, virtualized in virtualized layers of a hypervisor or the like.

Reference symbol 902 of FIG. 10 shows virtualized network function group (VNFs) realized in software called VNF (Virtual Network Function). Respective VNFs correspond to applications operating in virtual machines (VMs) on a server. In the present exemplary embodiment the VNF (IoT-GW) 321a is configured as an IoT-GW using this VNF.

A VM management part 903 in FIG. 10 manages a VM, is also called a VNF-Manager (VNFM), and performs VNF lifecycle management (instantiation, updating, search, scaling, termination, healing, and the like) and event notification.

Figure 11:
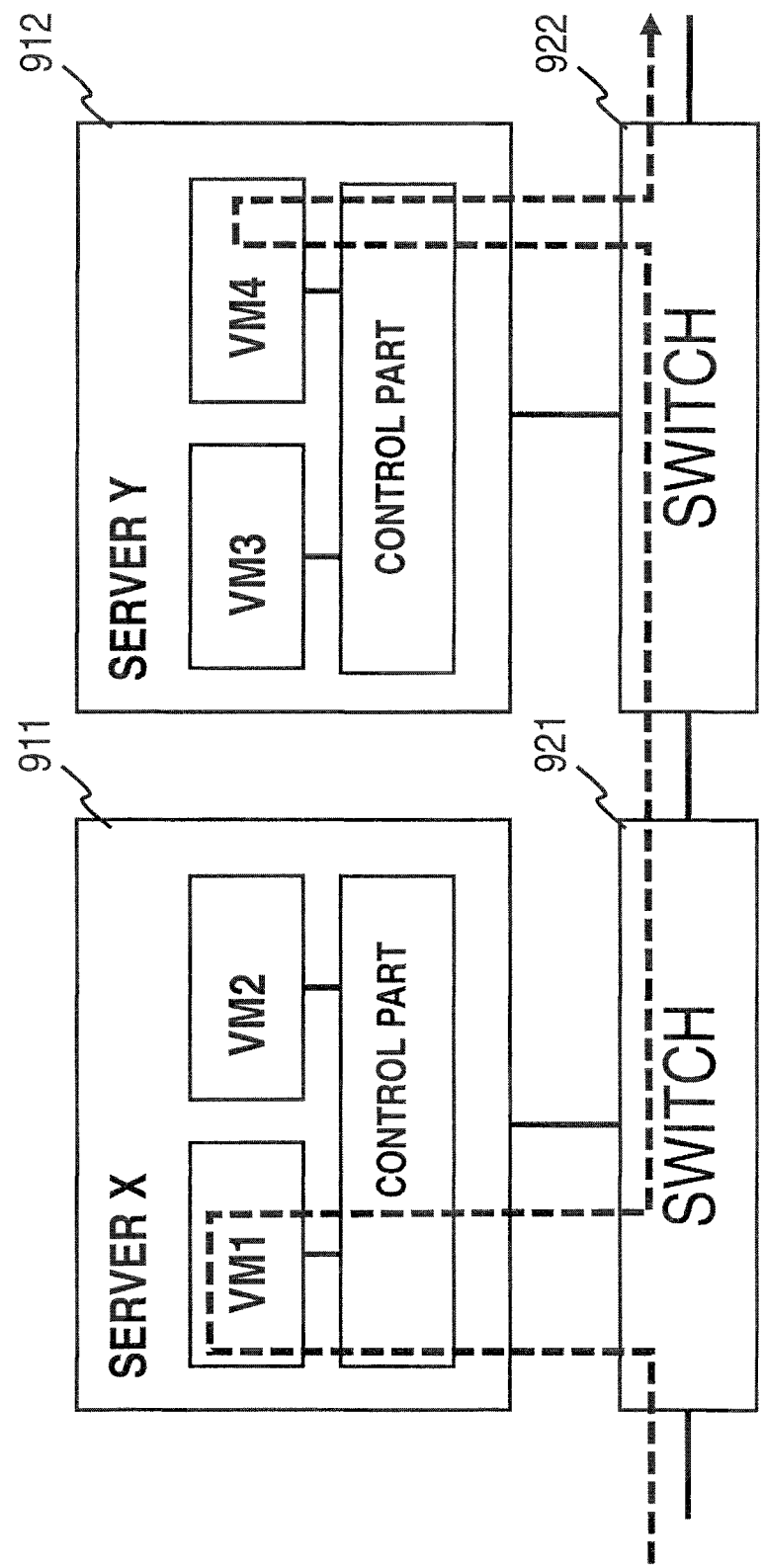
FIG. 11 is a diagram for describing a data plane configuration of the VNF in the second exemplary embodiment of the disclosure.
Figure 12:
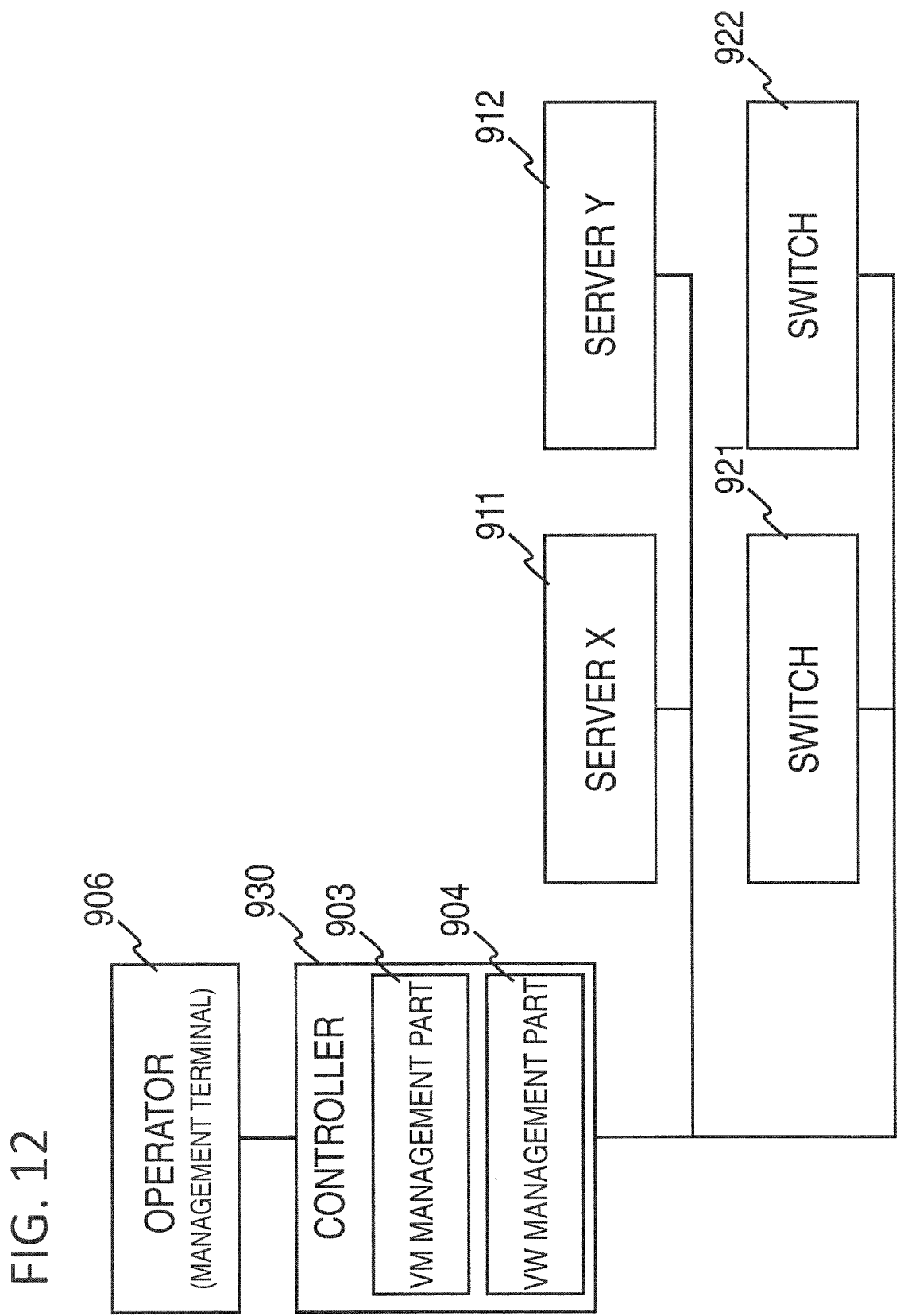
FIG. 12 is a diagram for describing a control plane configuration of the VNF in the second exemplary embodiment of the disclosure.

A NW management part 904 is a means for realizing desired service chaining by controlling data flow between VMs operating in 1 or more servers. FIG. 11 shows an example of service chaining configured by 2 VMs (VM1, VM4) operating in 2 servers X and Y, by controlling 2 switches. FIG. 12 shows a control plain for controlling the 2 switches and servers. In the example of FIG. 12, the VM management part 903 and the NW management part 904 are deployed in a controller 930, and in accordance with an instruction from an operator (management terminal) 906, the respective servers and switches can be controlled. It is to be noted that the controller 930 may be a apparatus similar to the controller 500 of FIG. 9. Below, in the present exemplary embodiment a description is given in which the controller 500 of FIG. 9 functions as the controller 930 of FIG. 12.

An orchestrator 905 performs orchestration of the abovementioned NFVI 901 and VNFs 902, in accordance with operation control instructions for the system inputted by an operator 906. The operator 906 is equivalent to OSS (Operation Service Systems) or BSS (Business Service Systems) of Non-Patent Literature 1.

Figure 13:
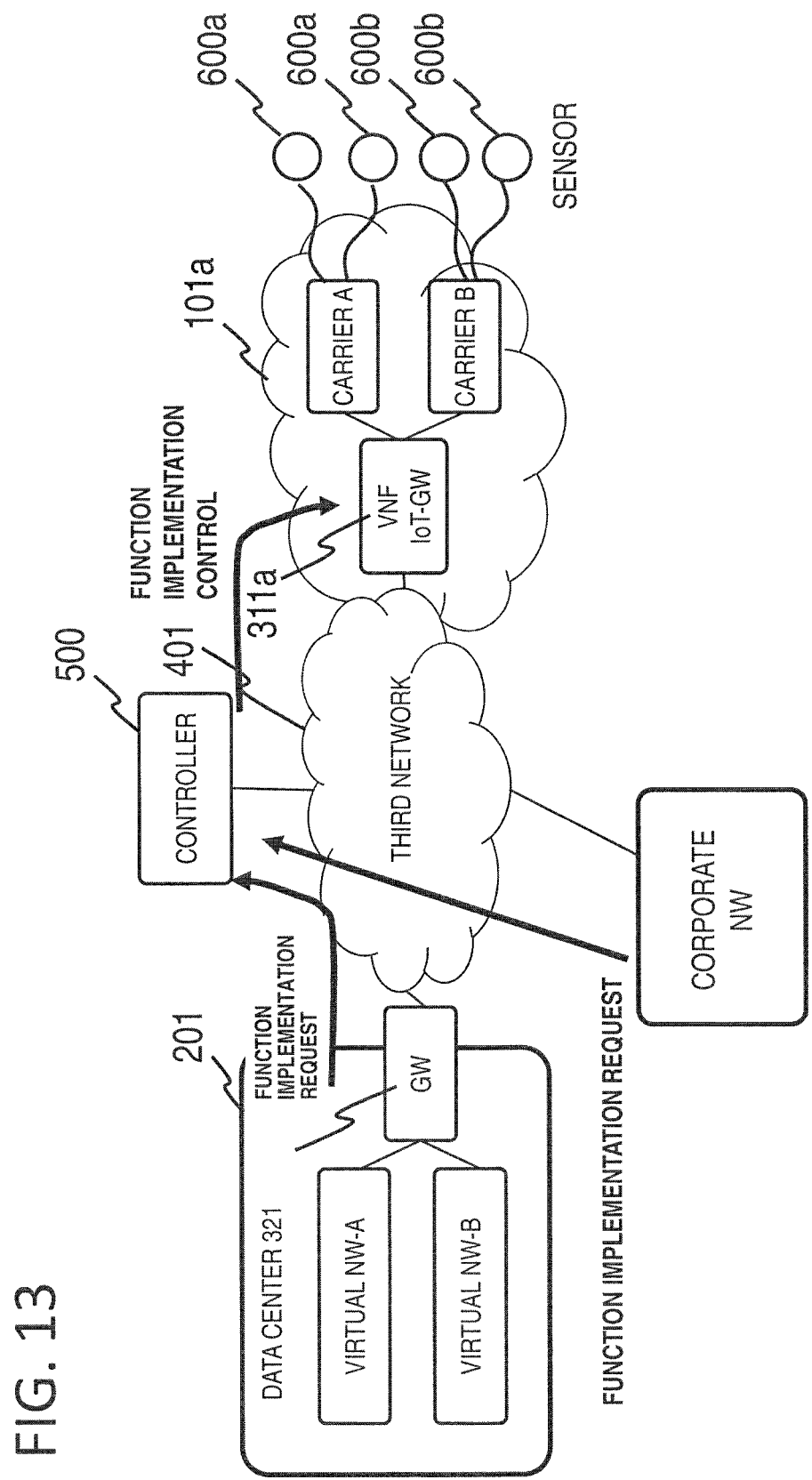
FIG. 13 is a diagram for describing an example of a configuration method for an IoT-GW in the network system in the second exemplary embodiment of the disclosure.

Continuing, a description is given concerning a method con ring the VNF IoT-GW 311a in the present exemplary embodiment. FIG. 13 is a diagram for describing an example of a configuration method for an IoT-GW in the network system in the second exemplary embodiment of the present disclosure. For example, carrier A accesses the controller 500 from an operator (management terminal) 906 deployed in a virtual NW on a data center 201 side, and transmits a request to create the VNF IoT-GW (function implementation request). The controller 500 implements function implementation control so as to create the IoT-GW 311a as a VNF as shown in FIG. 13.

According to the present exemplary embodiment, carrier A can perform function customizing for the IoT-GW 311a without providing its own hardware or software. In this case, carrier A may access the controller 500 from the operator (management terminal) 906, and transmit a request (function implementation request) to add or remove a function of the VNF IoT-GW 311a. The controller 500 that has received the request changes an application operating on the VM corresponding to the VNF IoT-GW 311a of FIG. 13, and by changing chaining between VMs, implements control to add/remove functions. As a function to add to the VNF IoT-GW 311a, various functions can be considered such as adding prescribed processing to data received from respective sensors (for example, statistical processing of averages or aggregation), adding data held by the VNF IoT-GW 311a to data received from respective sensors (previous day value, previous month value, previous year value, or reference values for data comparison).

Figure 14:
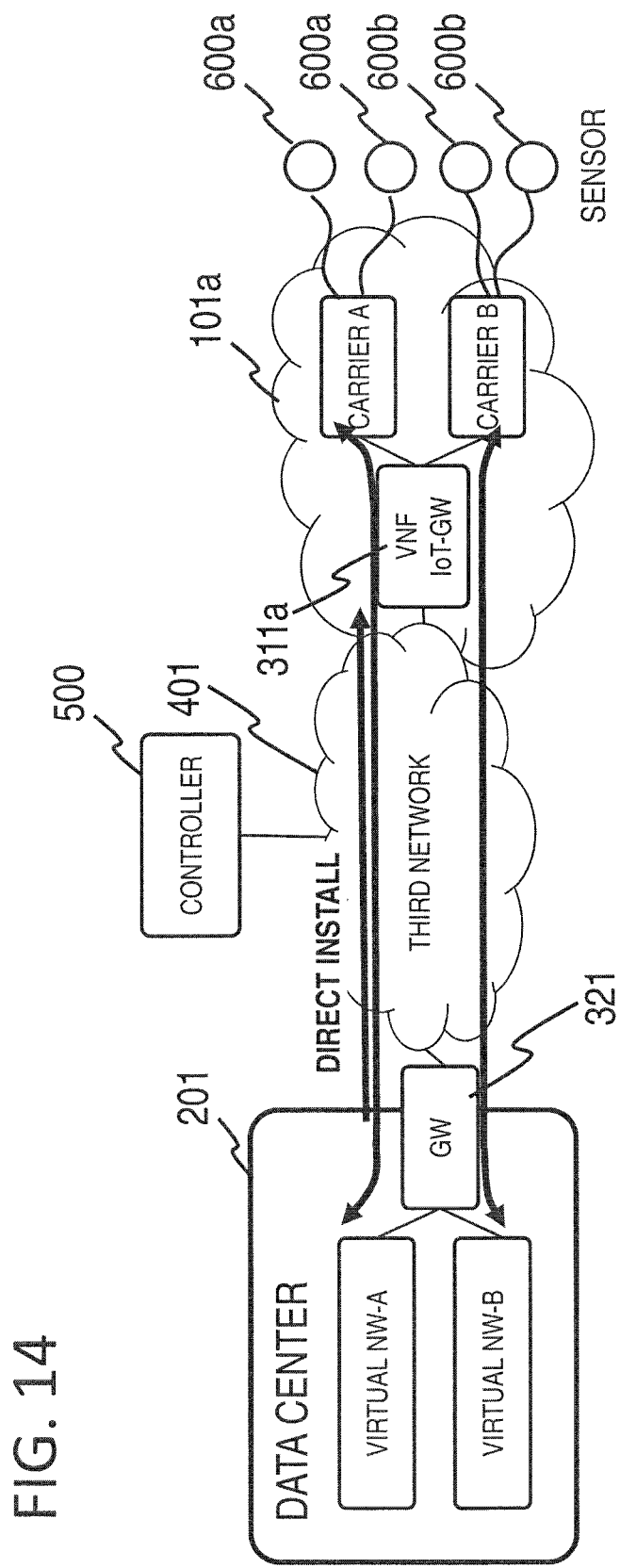
FIG. 14 is a diagram for describing another example of a configuration method for an IoT-GW in the network system in the second exemplary embodiment of the disclosure.

As shown in FIG. 13, a request to create an IoT-GW (function implementation request) or a function change request may be sent from a business network (on-premises network) of carrier A, rather than from the data center 201 side. As shown in FIG. 14, it is possible to have an arrangement such that an application program is directly installed in a VM corresponding to the VNF IoT-GW 311a on the data center 201 side, and by being operated, function of the VNF IoT-GW 311a can be changed.

Operations after creation of the VNF IoT 311a are similar to the first exemplary embodiment. According to present exemplary embodiment, in addition to the effect of the first exemplary embodiment, there is an advantage in that the VNF IoT-GW can be freely created and function thereof can be customized. For example, the first exemplary embodiment, with physical resource constraint, sharing of IoT-GW is assumed, but in the second exemplary embodiment it is possible for carrier A and carrier B to respectively start up and use dedicated VNF IoT-GWs. That is, the controller 500 of the present exemplary embodiment functions as a control apparatus where a function is built that performs prescribed processing, at an edge node (equivalent to IoT-GW) deployed in a first network, on data transmitted towards a second network (equivalent to data center 2011.

In the abovementioned example, a description was given citing an example in which the VNF IoT-GW 311a is built using a VNF, but virtualization is also possible for the GW 321.

Third Exemplary Embodiment

Figure 15:
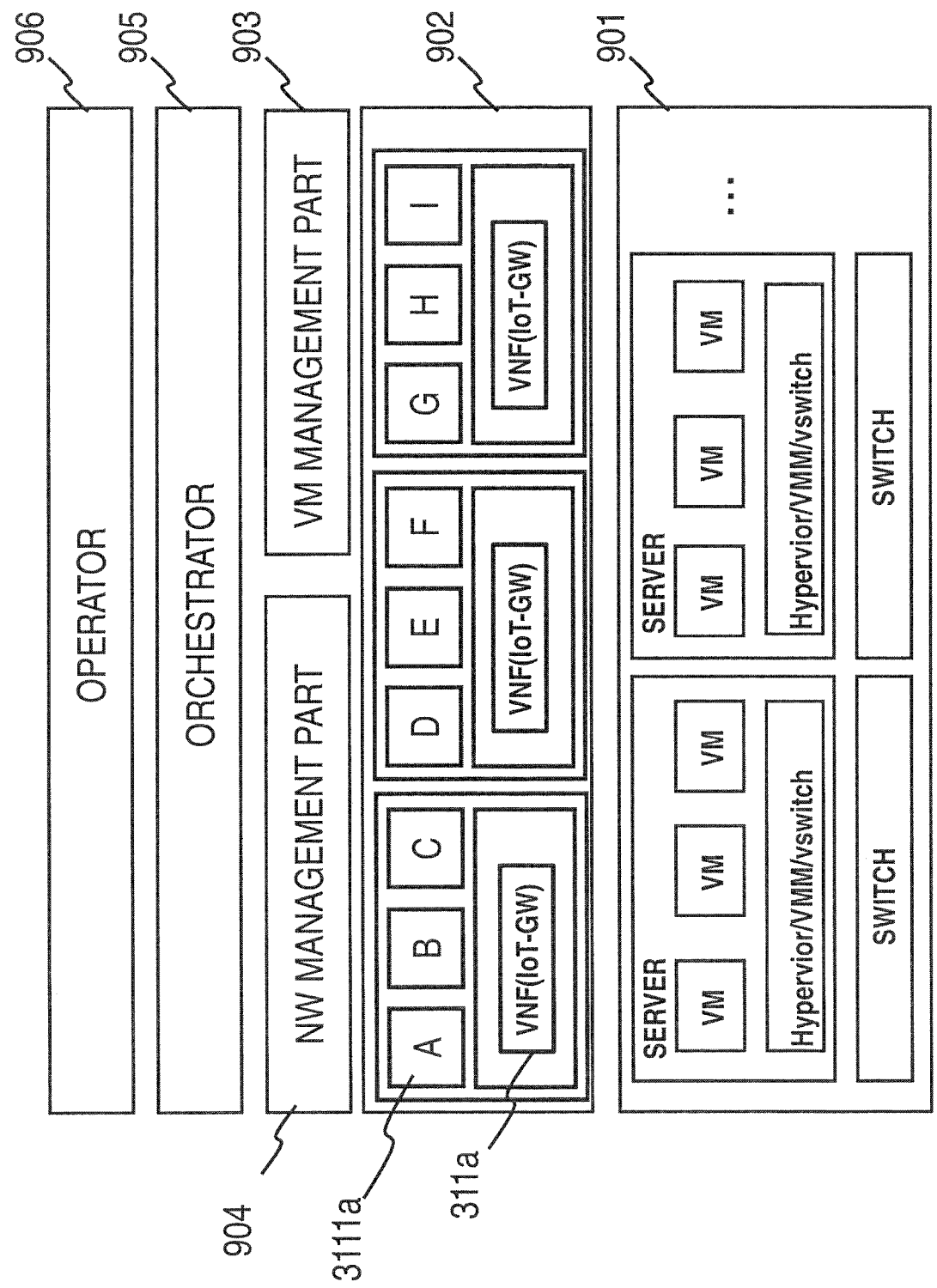
FIG. 15 is a diagram for describing a configuration of an IoT-GW in the network system in a third exemplary embodiment of the disclosure.

Continuing, a detailed description is given concerning a third exemplary embodiment of the present disclosure, in which a modification is added to the abovementioned second exemplary embodiment, making reference to the drawings. FIG. 15 is a diagram for describing a configuration of a VNF IoT-GW in the third exemplary embodiment of the disclosure. A point of difference from the second exemplary embodiment shown in FIG. 10 is that function for IoT-GWs represented by reference symbols A to I (reference symbol 3111a) is realized by VNF, and by modifying chaining thereof, it is possible to add a desired function to a VNF IoT-GW 311b. For example, by combining function A that performs aggregation of data in a past fixed period, and function B that calculates data average in a past fixed period, it is possible to add these functions to the VNF IoT-GW 311b.

Figure 16:
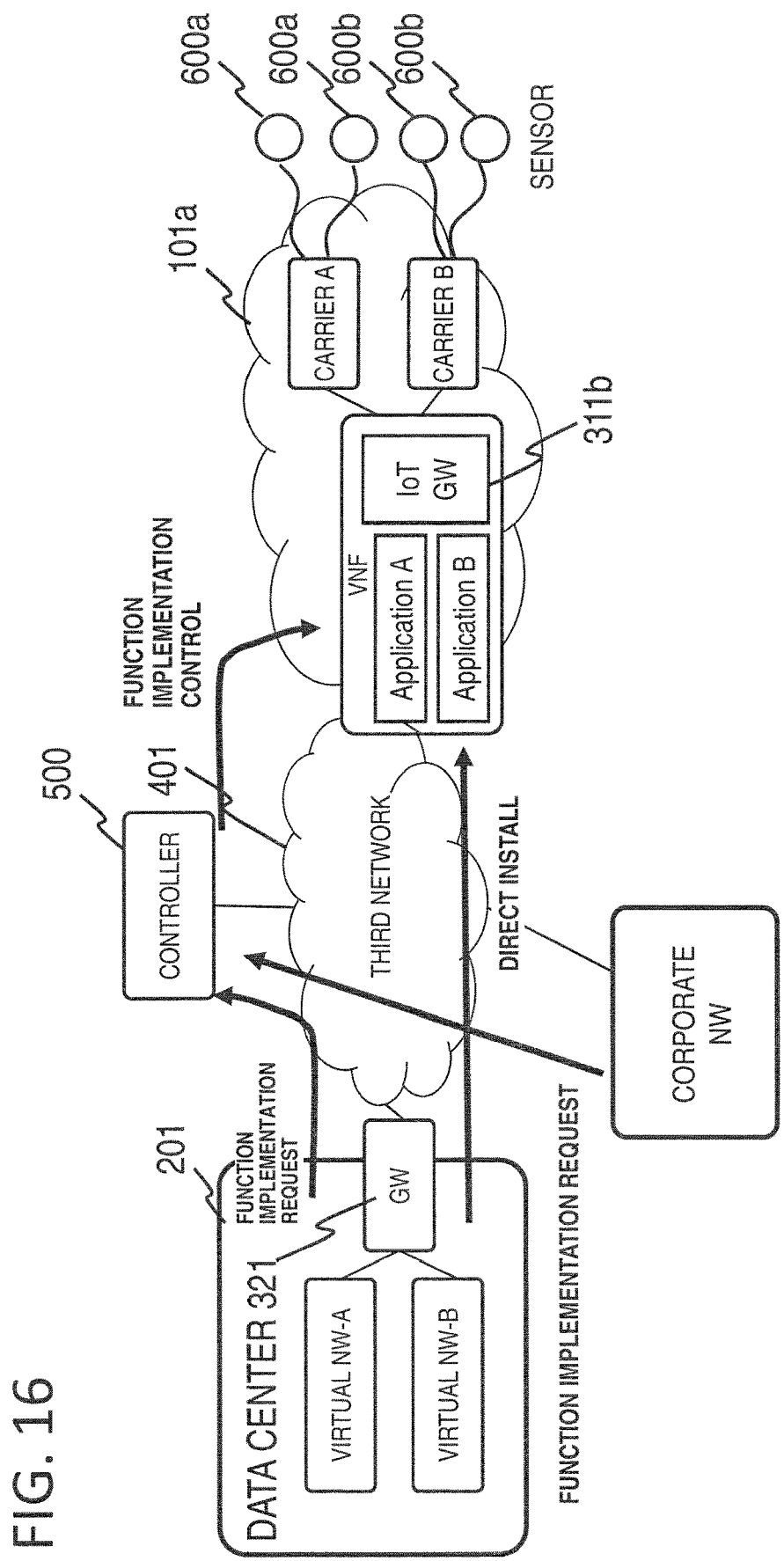
FIG. 16 is a diagram for describing another example of a configuration method for an IoT-GW in the network system in the third exemplary embodiment of the disclosure.

FIG. 16 is a diagram for describing an example of a configuration method for an IoT-GW in a network system in the third exemplary embodiment of the present disclosure. For example, carrier A accesses the controller 500 from an operator (management terminal) 906 deployed in a virtual NW on a data center 201 side, and transmits a request to add a function to the VNF IoT-GW 311b (function implementation request). The controller 500 selects a VNF (for example, a VNF corresponding to application A in FIG. 16) corresponding to a request function of carrier A from among VNFs 902 in FIG. 15, and performs an operation of switching service chaining. In this way, the request function of carrier A is added to the VNF IoT-GW 311b.

According to the present exemplary embodiment described above, it is possible to add a function to the VNF IoT-GW more simply in comparison with the second exemplary embodiment. It is to be noted that in the present exemplary embodiment also, as shown in FIG. 16, a request to create an IoT-GW (function implementation request) or function change request may be sent from a business network (on-premises network) of carrier A, rather than from the data center 201 side. As shown in FIG. 16, with an application program directly installed, a VNF may be created by requesting the controller 500 to provide a VNF.

Fourth Exemplary Embodiment

Figure 17:
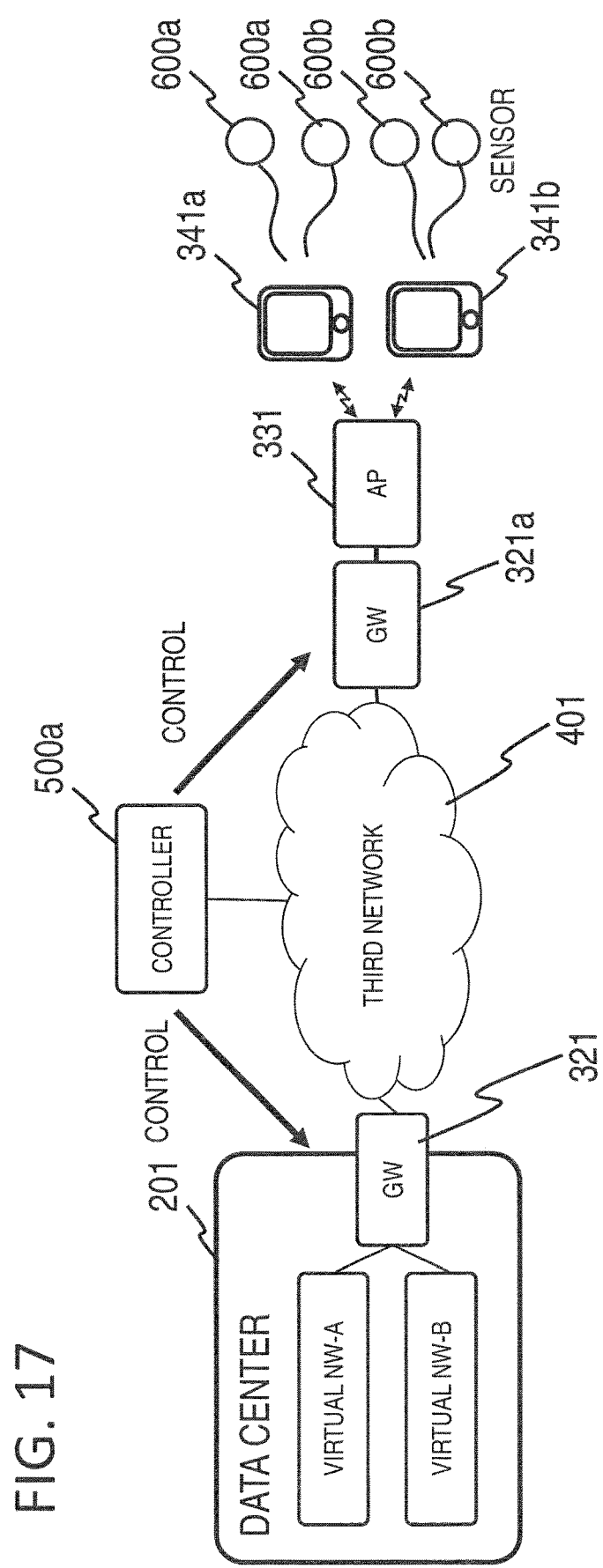
FIG. 17 is a diagram showing a configuration of a network system in a fourth exemplary embodiment of the disclosure.

Continuing, a detailed description is given concerning a fourth exemplary embodiment of the present disclosure in which a mobile terminal is used as a data transmission node, making reference to the drawings. FIG. 17 is a diagram showing a configuration of a network system in the fourth exemplary embodiment of the disclosure. A point of different from the first to third exemplary embodiments shown in FIG. 3 etc., is that, instead of an IoT-GW, a GW 321a and an AP (access point) 331 are deployed, and terminals 341a and 341b can transmit data received from a sensor 600 to a data center 201 side. Since the basic configuration and operations are otherwise the same as the first exemplary embodiment, a description is given below centered on points of difference.

The GW 321a in FIG. 17 is a gateway similar to the GW 321 on the data center 201 side. Specifically, the GW 321a transmits sensor data sent from the terminals 341a and 341b, to the data center 201 side, via a tunnel to the GW 321. And the GW 321a transmits data sent from the data center 201 side, to the terminals 341a and 341b, via a tunnel to the GW 321.

The AP 331 is a wireless LAN access point apparatus providing a mobile access environment to the terminals 341a and 341b.

The terminals 341a and 341b are smart phones or mobile terminal apparatuses connected wirelessly or wired to a sensor 600 respectively. After adding prescribed statistical processing to data received from the sensor 600, an application for transmitting to the data center 201 side is installed in the terminals 341a and 341b. Therefore, the terminals 341a and 341b take on some function of the IoT-GW of the first to third exemplary embodiments, and by cooperating with the GW 321a, provide function similar to the IoT-GW.

Similar to the first exemplary embodiment a controller 500a performs authentication of new sensors and setting of tunnels according to carrier, with respect to the GWs 321 and 321a. On the other hand, in the present exemplary embodiment it is not necessary for the controller 500a to install an application to realize an IoT-GW to the GW 321.

Figure 18:
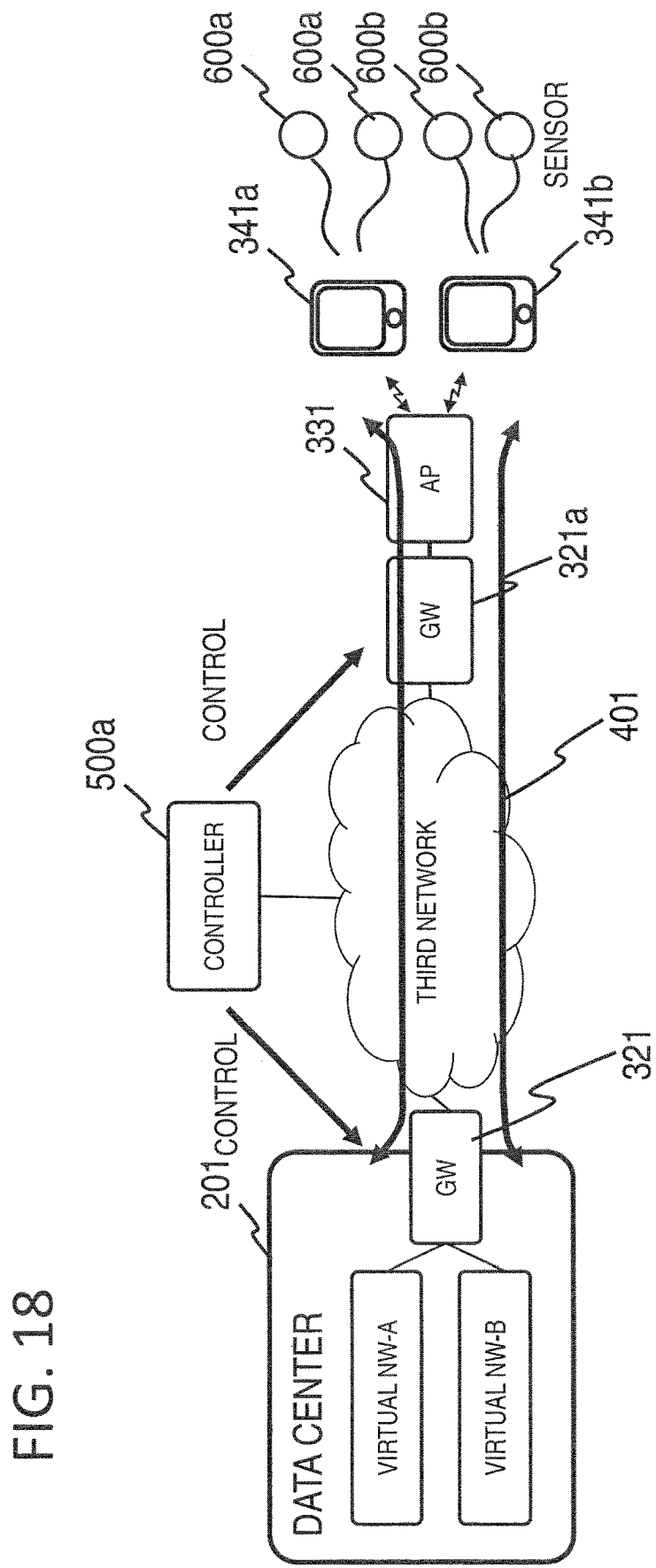
FIG. 18 is a diagram for describing operations of a network system in the fourth exemplary embodiment of the disclosure.

According to the present exemplary embodiment as described above, it is possible to transmit sensor data to the data center 201 side via the terminals 341a and 341b, as shown in FIG. 18. In the present exemplary embodiment, by having the GWs 321 and 321a perform selection of virtual network in accordance with carrier; it is possible to obtain an effect similar to the first exemplary embodiment. In addition to the above, according to the present exemplary embodiment, it is possible to use a terminal such as a smartphone as a data transmission node. Accordingly, it is possible to obtain a configuration with few constraints such as installation location of data transmission node, wiring, and the like.

According to the present exemplary embodiment, some function of the IoT-GW of the first exemplary embodiment is realized by an application operating on the terminals 341a and 341b. Therefore, by carriers A and B installing applications of the terminals 341a and 341b, and performing version upgrading, it is possible to easily customize various functions corresponding to IoT-GW data collection functions or statistical functions.

In the abovementioned exemplary embodiment a description was given in which terminal 341 transmits data to the data center via the GW 321a and AP 331, but in a case where the terminal 341 has a function connecting to a mobile communications network, it is possible to have a configuration transmitting sensor data via the mobile communications network.

Furthermore, according to the present exemplary embodiment, for terminals 341a and 341b it is possible to use a general user terminal different from the carrier. For example, instead of a smart meter or temperature data monitoring terminal that transmits data measured by an electrical power meter, it is also possible to entrust transmission of data measured by the power meter or thermometer to a general user terminal. In this case, it is possible to give a general user an incentive corresponding with data transmission. For example, in a case where a smart meter is out of order, an incentive such as electrical bill discount or granting of points, may be given to a user that cooperates with data transmission.

Modified Example 1 of Fourth Exemplary Embodiment

Figure 19:
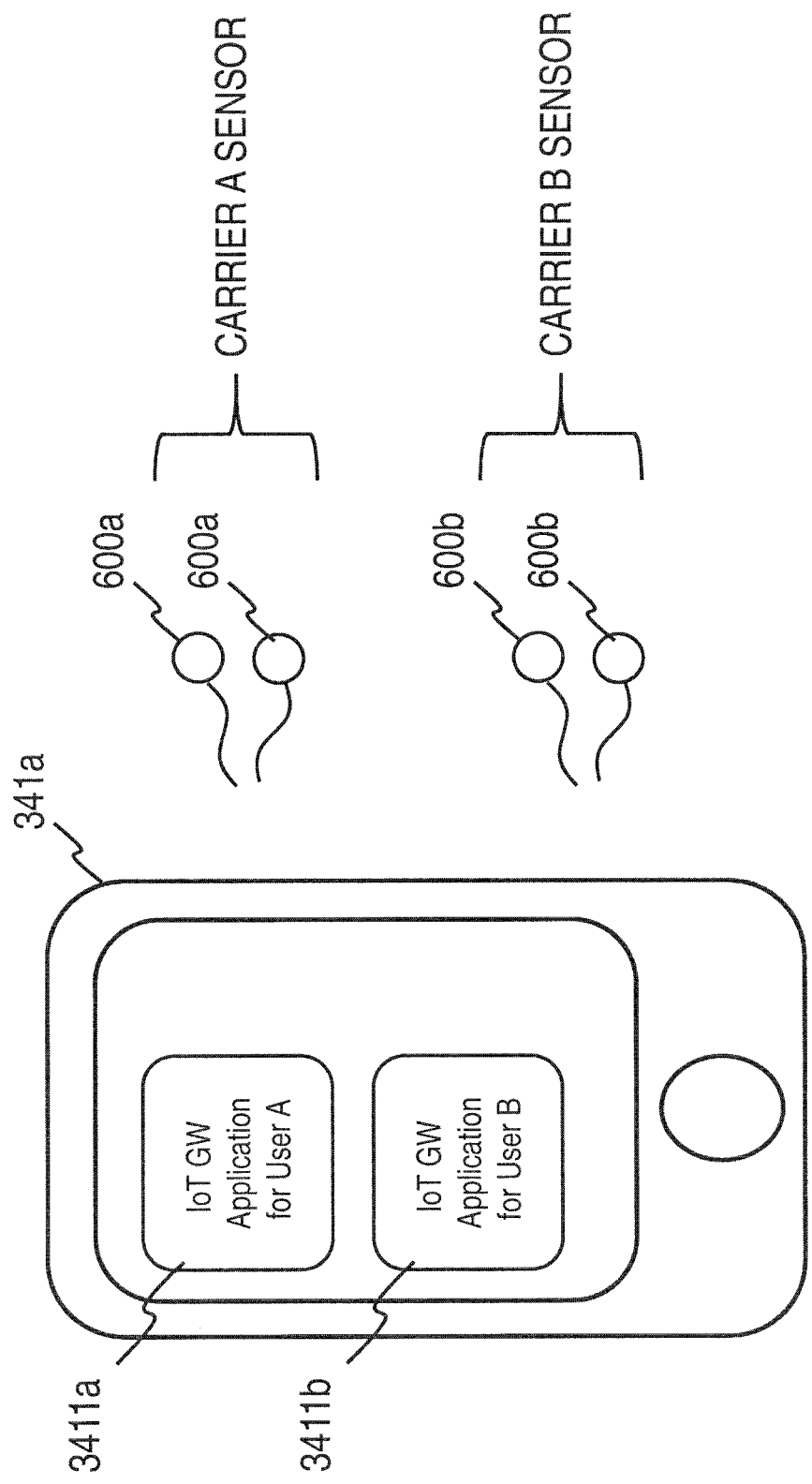
FIG. 19 is a diagram for describing a modified example of the fourth exemplary embodiment of the disclosure.

Continuing, a description is given concerning a modified example of the abovementioned fourth exemplary embodiment. FIG. 19 is a diagram for describing an application installed in terminal 341a. Referring to FIG. 19, two application programs are installed in terminal 341a. A first application program (IoT GW Application for user A) 3411a provides a function to collect data from the sensor 600a for carrier A, and, on performing prescribed statistical processing, to transmit to the data center 201 side. A second application program (IoT GW Application for user B) 3411b provides a function to collect data from the sensor 600b for carrier B, and, on performing prescribed statistical processing, to transmit to the data center 201 side. It is to be noted that the 2 application programs may have the same function, or may have different function. The frequency at which the application programs gather data or perform statistical processing is determined according to the content of data collected from the sensor 600, or the object of service content of the carrier using it. In other words, suitable application program is selected and installed in accordance with sensor type or object of data processing on the data center 201 side, at terminals 341a and 341b. From a similar viewpoint in terminal 341b also, data is collected from the sensor 600a, 600b of the carrier, and on performing prescribed statistical processing, an application that transmits to the data center 201 side is installed.

As described above, in the fourth exemplary embodiment, it is possible to install applications for a plurality of carriers, to collect data from the sensor 600 (for example, sensors 600a and 600b) of different carriers respectively, and to transmit to the data center 201 side. That is, the plurality of carriers can share terminals used in data transmission.

Modified Example 2 of Fourth Exemplary Embodiment

Figure 20:
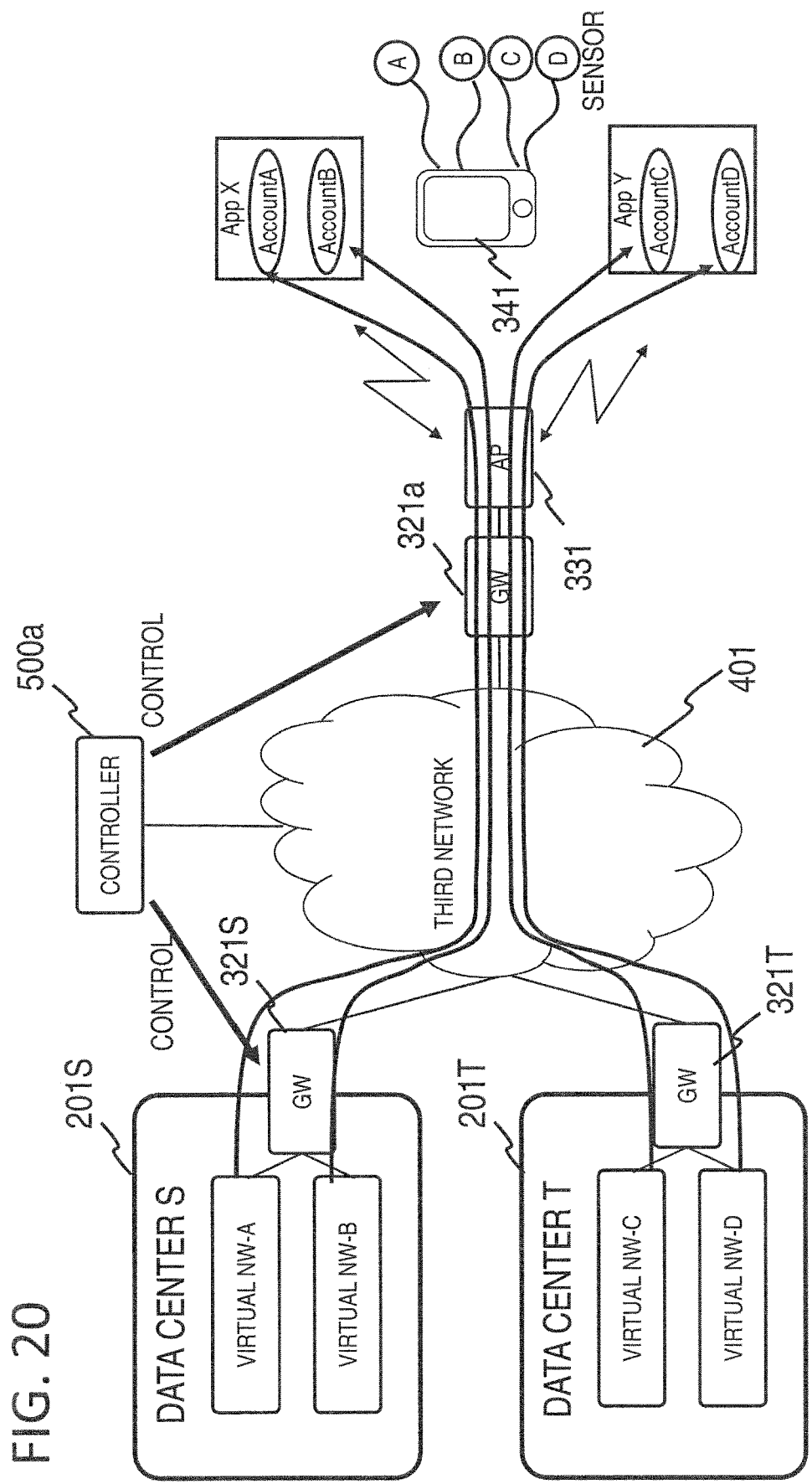
FIG. 20 is a diagram for describing another modified example of the fourth exemplary embodiment of the disclosure.

Continuing, a description is given concerning another modified example of the abovementioned fourth exemplary embodiment. In a case where there is an account switching function in an application installed in the terminals 341a and 341b, it is possible to use the account switching function, and have it used by a plurality of carriers. FIG. 20 is a diagram showing a state where two applications are installed in one terminal 341, and two accounts can be switched by the respective applications.

Referring to FIG. 20, data of sensor A is collected based on setting information of account A of application program X (App X). The collected data is transmitted to the GW 321a after being statistically processed based on the setting of account A of the application program X (App X). In the GW 321a, transmission is performed to a virtual NW-A of data center S 201S, after a suitable header has been added, based on tunnel information set by the controller 500a. Similarly, the data of sensor B is collected based on setting information of account B of the application program X (App X) of terminal 341, and is transmitted to a virtual NW-B of the data center S 201A. Similarly data of sensor C and D collected by application program Y (App Y), after statistical processing by application program Y (App Y), is transmitted to a virtual network specified by the data center T.

As described above, in the fourth exemplary embodiment, by installing applications for a plurality of carriers, and also switching the account, it is possible to collect data from a sensor (sensors A to D in FIG. 20) of different respective carriers, and to transmit to the data center 201 side. It is to be noted that in the example of FIG. 20, a description was given in which terminal 341 is made to identify a correspondence relationship between data from a sensor (sensors A to D in FIG. 20) and application setting, by using the account switching function of an application, but it is possible to use other methods also. For example, in a case where the OS (operating system) of terminal 341 is an OS handling multiple users, by respective carriers logging in as different users and performing setting in applications, a similar multi-user environment is realized.

As described above, in a case where a plurality of carriers share terminal 341, it is preferable to limit entities that can install an application or change the setting of an application. For example, by using a user authentication function of terminal 341 itself or an application for authentication installed in terminal 341, it is possible to determine whether an operator of terminal 341 has appropriate authority.

Fifth Exemplary Embodiment

Figure 21:
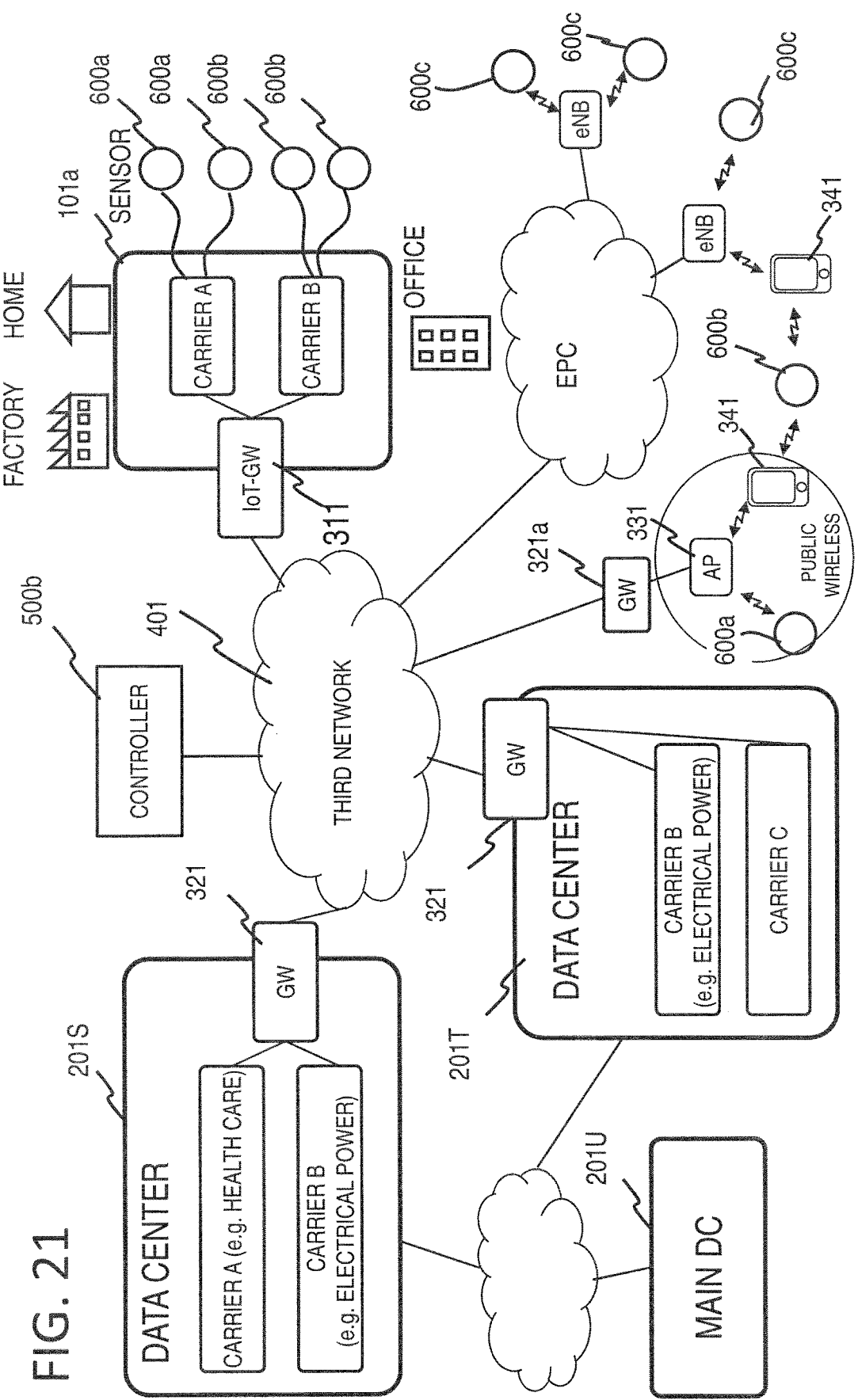
FIG. 21 is a diagram showing a configuration of a network system in a fifth exemplary embodiment of the disclosure.

Continuing, a description is given of a fifth exemplary embodiment of the present disclosure combining the first to fourth exemplary embodiments described above. FIG. 21 is a diagram showing a configuration of a network system in the fifth exemplary embodiment of the disclosure.

Referring to FIG. 21, a first network 101a, an EPC (Evolved Packet Core) network, a public wireless network, a controller 500b, and data centers 201S and 201T are connected via a third network 401. The controller 500b controls a GW 321 or a IoT-GW 311 that function as edge nodes of these networks, to build virtual network functions for each respective carrier.

Therefore, the first network 101a and the data center 201S (data center 2017) of FIG. 21 correspond to the configuration of the first exemplary embodiment. The IoT-GW 311 of the first network 101a of FIG. 21 can be configured by a VNF, similarly to the second and third exemplary embodiments.

For terminal 341 of FIG. 21, the configuration for transmitting data of sensors 600b and 600c to the data center 201S (data center 201T), via the EPC (Evolved Packet Core) network or the public wireless network, correspond to the configuration of the fourth exemplary embodiment.

In the example of FIG. 21, the data center 201S and the data center 201T are connected to a main data center (main DC) 201U. In this type of main data center (main DC) 201U, data sent from various sensors is analyzed, and it is possible to provide a big data analysis function providing various types of forecast and service.

As described above, the first to fourth exemplary embodiments of the present disclosure can be combined consistently.

A description has been given above of respective exemplary embodiments of the present invention, but the present invention is not limited to the abovementioned exemplary embodiments, and further modifications, substitutions and adjustments may be added within a scope that does not depart from fundamental technical concepts of the invention. For example, network configurations, respective element configurations and message expression forms shown in the respective drawings are examples for the purpose of aiding understanding of the invention, and are not intended to limit the invention to configurations illustrated in the drawings.

For example, in the abovementioned various exemplary embodiments, descriptions were given of building virtual network function between the IoT-GW 311 and the GW 321 using a tunneling protocol, but methods of configuring virtual network function are not limited to this method. For example, for the controller 500, it is possible to use a method of deploying a centralized controller known as an OpenFlow controller or an SDN (Software Defined Network) controller. In this case, for the centralized controllers it is possible to use a method of configuring another virtual network in which physical nodes in the third network 401 operate as virtual nodes, and the third network is logically separated.

In the abovementioned respective exemplary embodiments descriptions were given in which virtual networks are provided for each carrier, but even with the same carrier, in a case of providing different services, cases may be assumed where it is better to separate the virtual networks. In this case, the virtual networks are built for each service.

Finally, preferred modes of the present invention are summarized.

[First Mode]
(Refer to the network system according to the first aspect described above.)

[Second Mode]
It is preferred that the virtual network and the first physical network be connected to a first edge node provided on a boundary between the first physical network and an external network in the network system.

[Third Mode]
It is preferred that the virtual network and the second physical network be connected to a second edge node provided on a boundary between the second physical network and an external network in the network system.

[Fourth Mode]
It is preferred that the first and the second edge nodes be gateways that configure a tunnel for each of the services with an opposite edge node to transmit/receive data in the network system.

[Fifth Mode]
It is preferred that the network system further comprise a control apparatus that controls each virtual network configured for each of the services and controls the first and the second edge nodes.

[Sixth Mode]
It is preferred that, when a sensor used for any of the services is added to the first physical network in network system, the first edge node ask the control apparatus whether or not data transmitted by the sensor can be transmitted to the second physical network.

[Seventh Mode]
(Refer to the control apparatus according to the second aspect described above.)

[Eighth Mode]
(Refer to the method for constructing a virtual network according to the third aspect described above.)

[Ninth Mode]
(Refer to the program according to the fourth aspect described above.) It is to be noted that the abovementioned seventh to ninth modes may be expanded with regard to the second to sixth modes, similar to the first mode.

It is to be noted that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Various combinations and selections (including partial deletion) of various disclosed elements (including respective elements of the respective claims, respective elements of the respective exemplary embodiments and examples, respective elements of the respective drawings and the like) are possible within the scope of the disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST

100: first physical network
101: physical network
101a: first network
200: second physical network
201, 201S, 201T: data center
201U: main data center
310-320: edge node
311: IoT-GW
311a, 311b: VNF IoT-GW
321, 321a, 321S, 321T: GW
331: access point
341, 341a, 341b: terminal
400: network system
401: third network
500, 500a, 500b: controller
501: authentication information storage part
502: virtual network setting storage part
503: authentication part
504: virtual network control part
600, 600a to 600c: sensor
901: NFVI
902: VNF
903: VM management part
904: NW management part
905: orchestrator
906: operator
930: controller
3111a: VNF
3411a, 3411b: application

The invention claimed is:

1. A network system comprising:
a first physical network comprising:
  a first node configured to transmit a first data obtained from a first sensor;
  a second node configured to transmit a second data obtained from a second sensor; and
  a first edge node configured to transmit the first data and the second data; and
a second physical network comprising:
  a second edge node configured to receive data from the first edge node; and
  at least one apparatus configured to receive data received by the second edge node,
wherein the network system is configured to construct a first virtual network for transmitting the first data and a second virtual network for transmitting the second data between the first and the second physical networks, and
wherein the first edge node is configured to adjust data transmission frequency to the second edge node.

2. The network system according to claim 1, wherein the first and the second edge nodes are gateways that configure a tunnel with an opposite edge node to transmit/receive data.

3. The network system according to claim 2, further comprising a control apparatus configured to control each of the first virtual network and the second virtual network, wherein the control apparatus is configured to control the first and the second edge nodes.

4. The network system according to claim 3, wherein the first edge node is configured to, if a sensor is added to the first physical network, then ask the control apparatus whether or not data transmitted by the added sensor can be transmitted to the second physical network.

5. The network system according to claim 1 further comprising a control apparatus configured to control each of the first virtual network and the second virtual network, and wherein the control apparatus is configured to control the first and the second edge nodes.

6. The network system according to claim 5, wherein the first edge node is configured to, if a sensor is added to the first physical network, then ask the control apparatus whether or not data transmitted by the added sensor can be transmitted to the second physical network.

7. A control apparatus, connected to a first edge node provided on a boundary with a first physical network comprising: a first node configured to transmit a first data obtained from a first sensor and a second node configured to transmit a second data obtained from a second sensor, to a second edge node configured to receive data from the first edge node, wherein the second edge node is provided on a boundary with a second physical network comprising at least one apparatus configured to receive data received by the second edge node,
wherein the control apparatus comprises a controller configured to control the first and the second edge nodes and configured to construct a first virtual network for transmitting the first data and a second virtual network for transmitting the second data between the first and the second physical networks, and
wherein the first edge node is configured to adjust data transmission frequency to the second edge node.

8. The control apparatus according to claim 7, wherein the control apparatus is configured to answer whether or not data transmitted by a sensor added to the first physical network can be transmitted to the second physical network in response to a request from the first edge node.

9. A method for constructing a virtual network, the method comprising:
  causing a control apparatus, which is connected to a first edge node provided on a boundary with a first physical network comprising: a first node configured to transmit a first data obtained from a first sensor and a second node configured to transmit a second data obtained from a second sensor, to a second edge node configured to receive data from the first edge node, wherein the second edge node is provided on a boundary with a second physical network comprising at least one apparatus configured to receive data received by the second edge node, to receive setting information for constructing a first virtual network for transmitting the first data and a second virtual network for transmitting the second data between the first and the second physical networks; and
  causing the control apparatus to control the first and the second edge nodes and to construct the first virtual network and the second virtual network using the received setting information,
  wherein the first edge node is configured to adjust data transmission frequency to the second edge node.

10. A non-transitory computer-readable recording medium storing thereon a program, which if executed, causes a computer connected to a first edge node provided on a boundary with a first physical network comprising: a first node configured to transmit a first data obtained from a first sensor and a second node configured to transmit a second data obtained from a second sensor, to a second edge node configured to receive data from the first edge node, wherein the second edge node is provided on a boundary with a second physical network comprising at least one apparatus configured to receive data received by the second edge node, to execute processes comprising:
  a process of receiving setting information for constructing a first virtual network for transmitting the first data and a second virtual network for transmitting the second data between the first and the second physical networks;
  a process of controlling the first and the second edge nodes and constructing the first virtual network and the second virtual network using the received setting information; and
  a process of controlling the first edge node to adjust data transmission frequency to the second edge node.

* * * * *